(12) United States Patent
Segawa et al.

(10) Patent No.: US 6,339,874 B2
(45) Date of Patent: *Jan. 22, 2002

(54) ASSEMBLING APPARATUS ASSEMBLING BODY SIDE OF AUTOMOTIVE VEHICLE

(75) Inventors: Teruo Segawa; Jyun Matsubara; Kaoru Okuyama; Yukihide Ueda; Shyouichi Takahashi; Setsuo Nakamura; Kazuo Urakami; Shin Kishita, all of Kanagawa-ken (JP)

(73) Assignee: Nissan Motor Co., Ltd., Kanagawa-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/143,370

(22) Filed: Aug. 28, 1998

(30) Foreign Application Priority Data

Aug. 28, 1997 (JP) .............................................. 9-232978

(51) Int. Cl.[7] .............................................. B23P 19/00
(52) U.S. Cl. .............................. 29/824; 29/783; 29/791; 29/281.4
(58) Field of Search .......................... 29/824, 783, 791, 29/281.4, 430, 464

(56) References Cited

U.S. PATENT DOCUMENTS

| 5,088,176 A | * | 2/1992 | Koga ........................... 29/824 |
| 5,123,161 A | * | 6/1992 | Kubo et al. .................... 29/784 |
| 5,127,569 A | * | 7/1992 | Sekine et al. .................. 29/824 |
| 5,199,156 A | * | 4/1993 | Rossi ........................... 29/509 |
| 5,409,158 A | * | 4/1995 | Angel .......................... 29/430 |

FOREIGN PATENT DOCUMENTS

| EP | 502601 | * | 5/1987 | .................. 29/791 |
| GB | 2185942 | * | 5/1987 | .................. 29/791 |
| JP | 1-2222828 | | 9/1989 | |
| JP | 7-96397 | | 4/1995 | |

* cited by examiner

Primary Examiner—David P. Bryant
Assistant Examiner—Jermie E. Cozart
(74) Attorney, Agent, or Firm—McDermott, Will & Emery

(57) ABSTRACT

An assembling apparatus assembling a body side of an automotive vehicle includes: a moving body provided in a transfer line; a clamp device mounted to the moving body fixing and positioning a body side outer in an upright position in which the body side outer is fixed in such a manner that a roof rail end of the body side outer is positioned substantially above the side sill end of the body side outer; and a welding robot disposed in a side of the transfer line. The welding robot assembles the body side by welding the body side outer positioned by the clamp device.

3 Claims, 36 Drawing Sheets

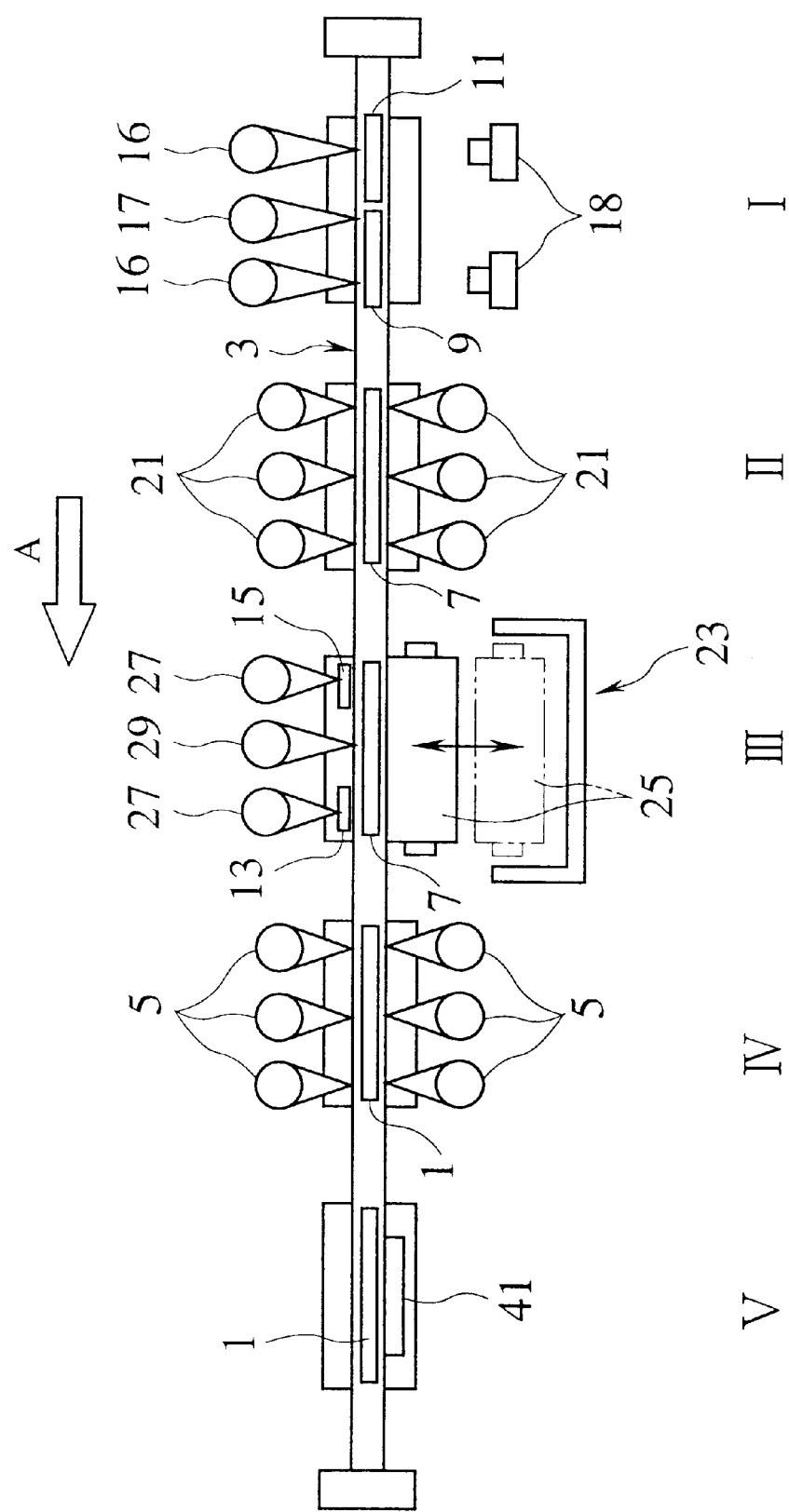

ASSEMBLING APPARATUS ASSEMBLING BODY SIDE OF AUTOMOTIVE VEHICLE

BACKGROUND OF THE INVENTION

1. Field of the Invention

The present invention relates to an assembling apparatus assembling a body side of an automotive vehicle which is used at a time of assembling the body side such as assembling various kinds of inner parts to a body side outer part.

2. Description of the Related Art

In a body side of the automotive vehicle, there is a structure which is assembled by a body side outer and a various kinds of inner parts. The body side outer comprises a front part constituting a part disposed in front of a vehicle body and a rear fender part constituting a part disposed in the rear of the vehicle body. The front part and the rear fender part are joined by welding. After welding the front part and the rear fender part to construct the body side outer, the various kinds of inner parts are joined to body side outer by welding. Then the body side of the automotive vehicle is assembled.

In the above assembling operation, as shown in FIG. 1, there is provided a transfer apparatus 205 for transferring a front part 201 and a rear fender part 203 in a state of laying down, for example, as disclosed in Japanese Patent Application Laid-Open Publication No. 7-96397, and a plurality of welding robots 207 for welding the parts 201 and 203 to each other and welding the inner part to the parts 201 and 203.

The transfer apparatus 205 is provided with two transfer bars 209 extending to the transfer direction and capable of moving in the longitudinal direction, and fingers 211 serving as a work receiver for supporting the parts 201 and 203 and disposed on the transfer bar 209. On a table 213 disposed below the transfer bar 209, there is provided a jig 215 which ascends the parts 201 and 203 so as to be apart from the finger 211 and fixedly holds the parts so as to position them at a time of welding. The jig 215 is provided in such a manner as to vertically movable by a lifter. When the finger 211 holding the parts 201 and 203 moves forward together with motion of the transfer bar 209, the parts 201 and 203 are also transferred forward, in a state that the jig 215 is unclamping the parts 201 and 203.

The assembling operation comprises some stages. In a first stage, the front part 201 and the rear fender part 203 are set on the transfer line and fixed and held by the jig 215 which is in an ascent state, and thereafter, both the parts 201 and 203 are temporarily welded to each other by using the welding robots 207. In a second stage, the connection portions for connecting the parts 201 and 203 to each other and small parts which are already assembled to the parts 201 and 203 are additionally welded. Next, in a third stage, the various kinds of inner parts are set to the parts 201 and 203 and are temporarily welded to each other, and thereafter, in a fourth stage, the parts are additionally welded, whereby the welding of the body side is completed.

Finally, in a fifth stage, the body side which is completely welded is stood up by a stand-up apparatus having an oil hydraulic cylinder for a standing-up mechanism, and thereafter is hung up by the stand-up apparatus so as to carry the body side out to the following stage.

However, in the conventional operation of assembling the body side, there are following problems.

(1) Since at a time of performing the welding operation and the transfer operation, it is necessary to provide a plurality of special jigs 215 and fingers 211 for fixing and holding the bottom surface of the works as the front parts 201 and the rear fender parts 203 in the laying down state, the facility cost is required. Particularly, when a plurality of types of automotive vehicle are produced in the same line, it is necessary to provide the jigs and fingers for a wide range of usage so that the facility cost is extremely high. Further, the stand-up apparatus for standing the work up after welding requires also a high cost.

(2) In the welding operation for the additional welding by the plurality of welding robots, the welding robots interfere with each other due to an obstruction of the jig 215, thereby deteriorating the operation efficiency.

(3) Since the work W to be assembled as the front part 201 or the rear fender part 203 is supported by the jig 215 at left and right side bottom portions thereof in a state that the work W is laying down in a horizontal direction with respect to the transfer apparatus, the center portion of the work W is bent due to the gravitational force and deformed as shown in FIGS. 2A and 2B. Then, since the welding operation is performed in the bent state, the assembling accuracy is deteriorated. When the jig for supporting the center portion in order to prevent the center portion from bending, the cost is increased, and the operable area for the welding robot is narrowed.

SUMMARY OF THE INVENTION

The present invention has been achieved with such points in view.

It therefore is an object of the present invention to provide an assembling apparatus assembling a body side of an automotive vehicle with a reduced cost at a time of assembling the body side.

Another object of the present invention is to provide an assembling apparatus assembling a body side of an automotive vehicle with an improved operation efficiency at a time of assembling the body side.

Still another object of the present invention is to provide an assembling apparatus assembling a body side of an automotive vehicle with an improved assembling accuracy at a time of assembling the body side.

To achieve the objects, according to an aspect of the present invention, there is provided an assembling apparatus assembling a body side of an automotive vehicle, comprising; a moving body provided in a transfer line; a clamp device mounted to the moving body fixing and positioning a body side outer in an upright position in which the body side outer is fixed in such a manner that a roof rail end of the body side outer is positioned substantially above the side sill end of the body side outer; and an assembling robot disposed in a side of the transfer line, the assembling robot assembling the body side by connecting the body side outer positioned by the clamp device.

In accordance with the assembling apparatus assembling a body side mentioned above, in the upright position of the body side outer by the clamp device, the lower end of the side sill thereof is fixed and positioned, and the assembling operation is performed with respect to the body side outer in the upright position by the assembling robot disposed in the side portion of the transfer line.

Accordingly, the side sill lower end which can be made the same shape between the different vehicle kinds is positioned and fixed and the assembling operation of the body side is performed by assembling in the upright position, so that an exclusive or specific jig for fixing the body side outer is not required, the fixing device for positioning and fixing the work can be made compact and widely used, and a cost for equipment can be widely reduced. Further, since the operation of the assembling robot is performed from both sides of the body side outer in the standing state, an interference between the robots is avoided, and an efficiency of operation can be improved. Further, since the transfer and assembling operation is performed in a state of standing the body side outer, the deformation is hardly generated in comparison with the state of being horizontally laid, so that in addition that the assembling accuracy is improved, the necessary operating space becomes a smaller.

According to another aspect of the present invention, there is provided an assembling apparatus assembling a body side of an automotive vehicle, comprising; a moving body provided in a transfer line; a clamp device mounted to the moving body fixing and positioning a body side outer in an upright position in which the body side outer is fixed in such a manner that a roof rail end of the body side outer is positioned substantially above the side sill end of the body side outer; and an assembling robot disposed in a side of the transfer line, the assembling robot assembling the body side by connecting the body side outer positioned by the clamp device, wherein the clamp device projects downwardly from the moving body; and the clamp device fixes and positions the body side outer in such a manner that the roof rail end of the body side outer is hanged by the clamp device.

In accordance with the structure mentioned above, in the upright position, the body side outer by means of the positioning and fixing means, the roof rail end thereof is hanged suspendedly and supported so as to be fixed and positioned, and the assembling operation is performed with respect to the body side outer in a standing state by the assembling robot disposed in the side portion of the transfer line.

Therefore, a specific jig for fixing and holding the body side outer corresponding to each of the vehicle kinds is not required, so that the same effect as that of the first aspect such that the fixing jig for positioning and fixing the body side outer can be easily made compact and widely used can be obtained.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 3 is a plan view which schematically shows a total structure of an assembling apparatus assembling a body side of an automotive vehicle in accordance with an embodiment of the present invention;

DETAILED DESCRIPTION OF THE PREFERRED EMBODIMENTS

Figure 1:
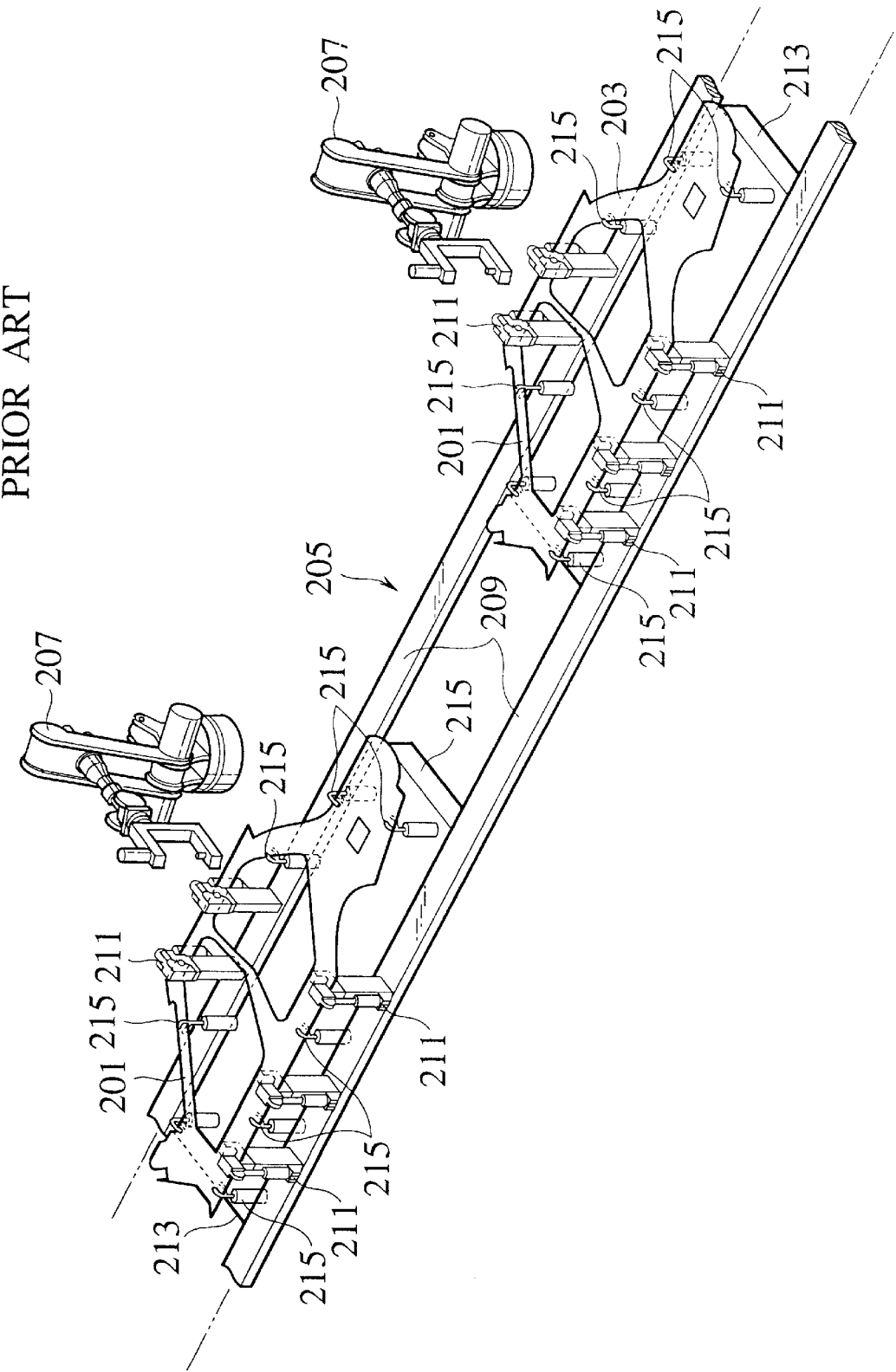
FIG. 1 is a perspective view which schematically shows an assembling apparatus assembling a body side of an automotive vehicle in accordance with the related art.

There will be detailed below the preferred embodiments of the present invention with reference to the accompanying drawings. Like members are designated by like reference characters.

Figure 4:
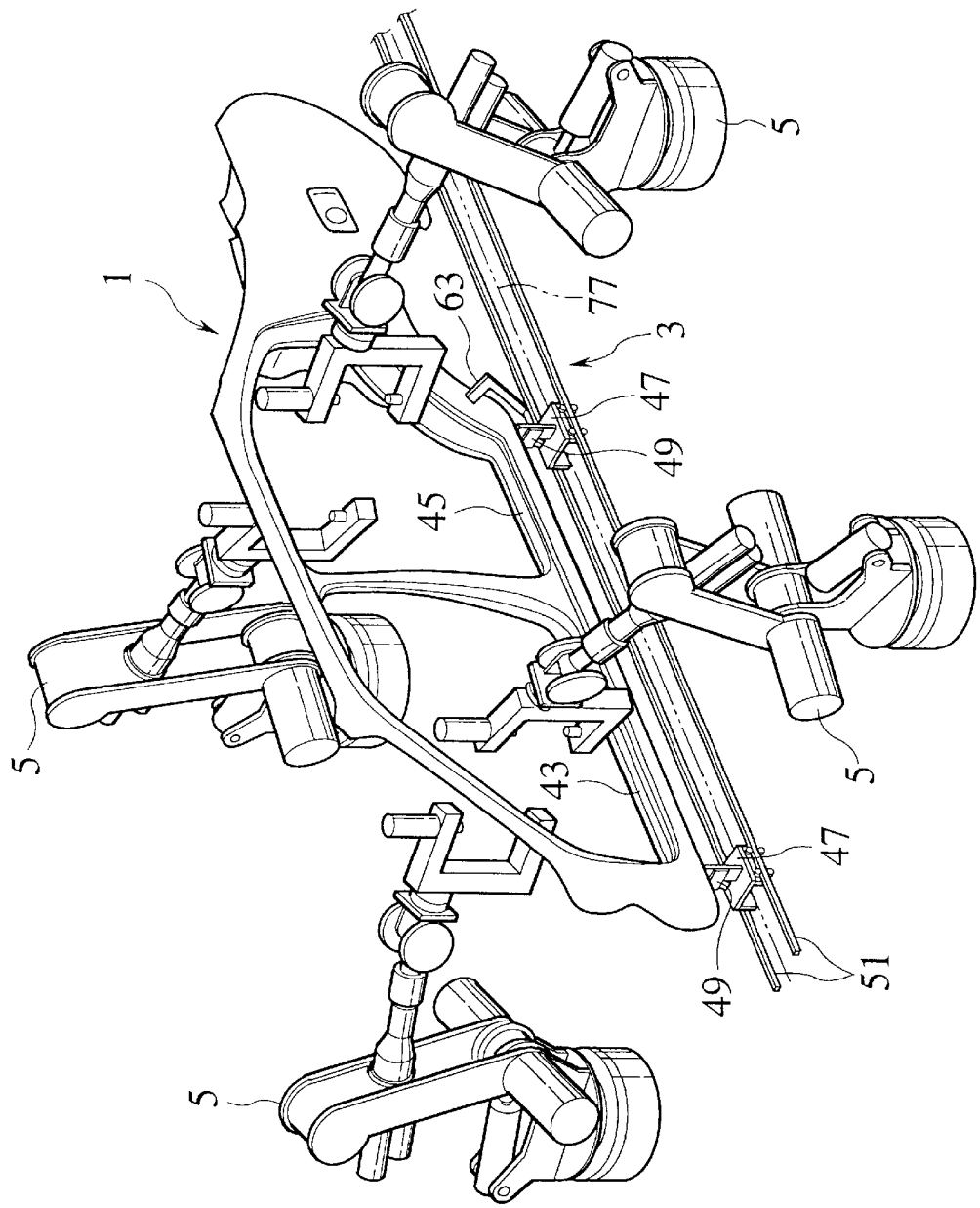
FIG. 4 is a perspective view which shows a part of the body side assembling apparatus.
Figure 5:
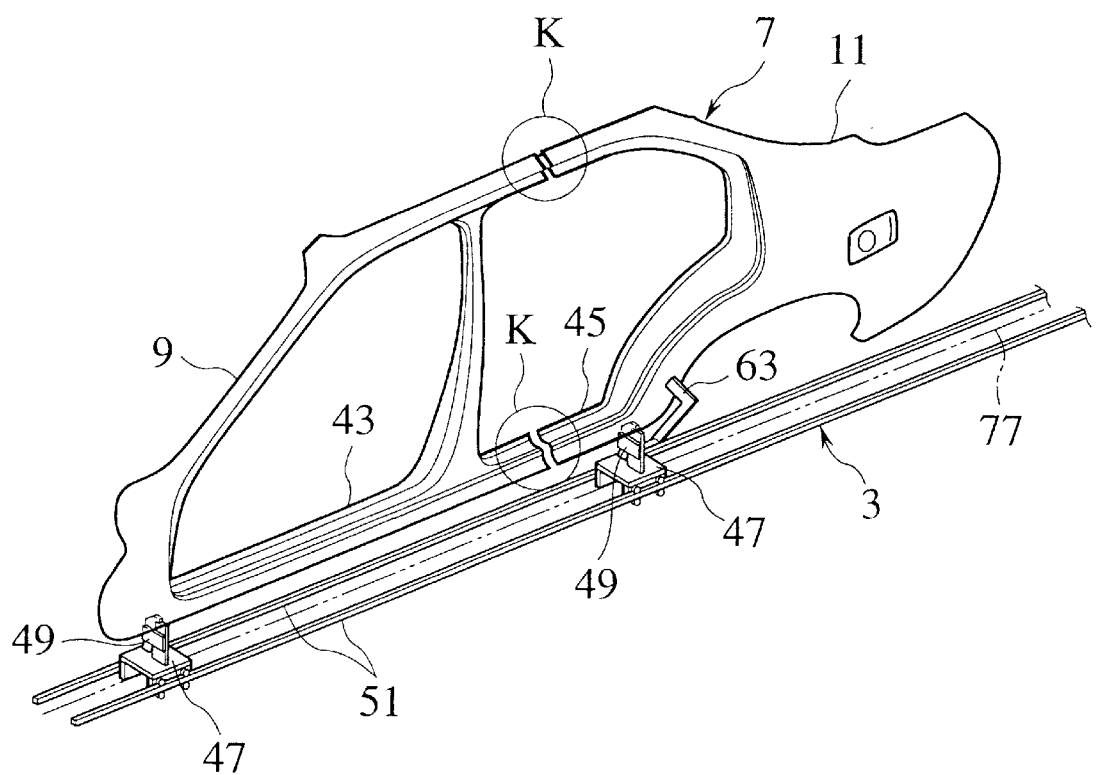
FIG. 5 is a perspective view showing a state in which front and rear parts are set on a transfer line of an assembling apparatus shown in FIG. 4.
Figure 6:
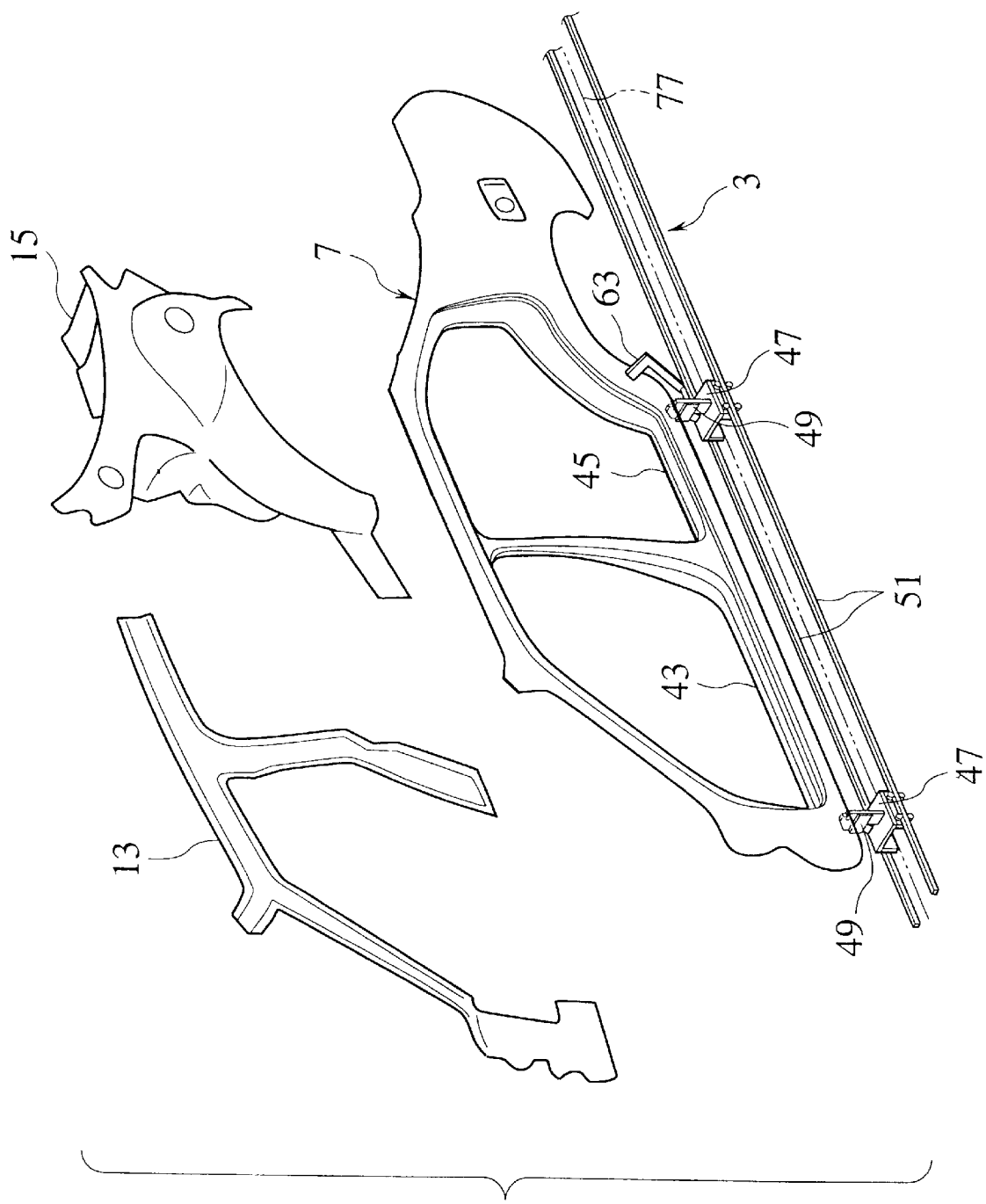
FIG. 6 is a perspective view showing a state in which an inner part is set to the body side outer assembled on the transfer line of the assembling apparatus shown in FIG. 4.

FIG. 3 is a operation process drawing which schematically shows a total line of an assembling apparatus assembling an body side of an automotive vehicle according to the present invention, in which a transfer direction is from the right to the left in the drawing as shown in an arrow A. More specifically, as shown in FIG. 4, the assembling apparatus assembling an body side 1 of an automotive vehicle in accordance with an embodiment of the present invention is structured in such a manner as to position and fix the body side 1 on a transfer apparatus 3 constituting a transfer line in an upright position where a roof rail end is set to be an upper portion and a side sill end is set to be a lower portion. A plurality of welding robots 5 are disposed in both sides of the transfer apparatus 3. As shown in FIGS. 5 and 6, the body side 1 comprises a body side outer 7 which is formed by welding a front part 9 constituting body parts surrounding a front door of the vehicle and a rear fender part 11 constituting a rear fender, a rear quarter pillar, etc. Furthermore, the front inner parts 13 and the wheel house/rear pillar inner parts 15 shown in FIGS. 6 are to be welded to the body side outer 7.

A first stage I shown in FIG. 3 corresponds to a stage at a position shown in FIG. 5. In the stage, after the front part 9 and the rear fender part 11 are set on the transfer apparatus 3 by work set robots 16, a connecting portion K between the respective parts 9 and 11 are temporarily joined by welding by means of a welding robot 17. A guide post 18 for positioning the work set robot 16 at a time of setting the work is provided at a position opposite to the work set robot 16 with respect to the transfer apparatus 3.

Figure 7:
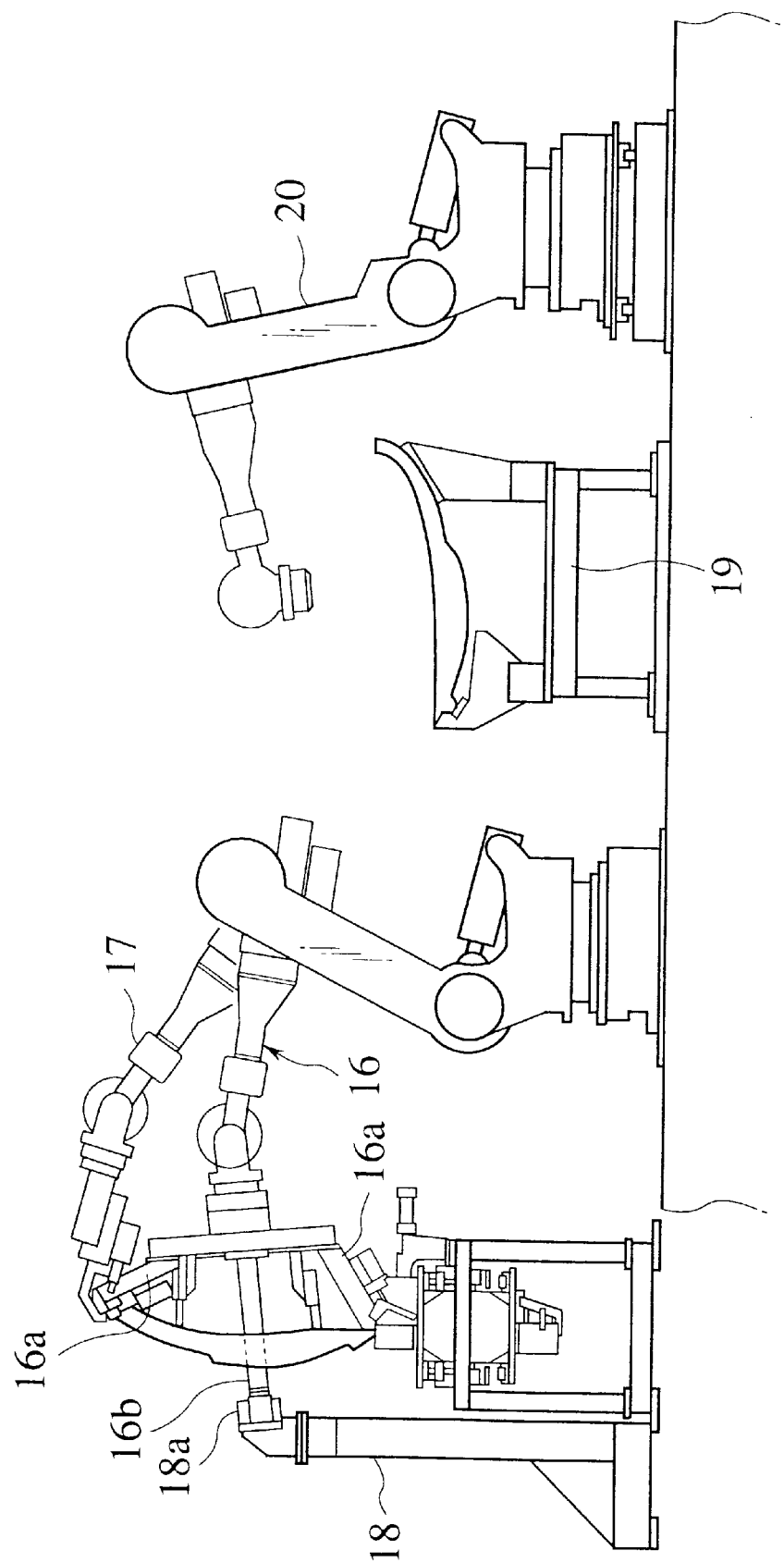
FIG. 7 is a side elevational view which shows a concrete structure of a first operation stage I in the operation stage shown in FIG. 3.

FIG. 7 shows the specific construction of the first stage I and corresponds to a view as seen from a right side to a left side in FIG. 3. The work set robots 16 are provided with grip portions 16a at upper ends and lower ends thereof and a positioning arm 16b at middle portion thereof. The positioning arm 16b is positioned in such a manner that the tip portion of the positioning arm 16b is inserted into a guide portion of the guide post 18. As shown in FIG. 7, a temporary table 19 is located at the right side of the work set robots 16 and the welding robot 17 for stocking the front parts 9 and the rear fender parts 11. Furthermore, a transferring robot 20 is located at the right side of the temporary table 19 for transferring the front parts 9 and the rear fender parts 11 from a station of the previous stage to the temporary table 19.

In a second stage II, the body side outer 7 constituted by welding the respective parts 9 and 11 to each other is additionally welded by welding robots 21 disposed in both sides of the transfer apparatus 3.

In a third stage III, an inner part consisting of a front inner part 13 and a wheel house rear pillar inner part 15 shown in FIG. 6 is assembled to the body side outer 7 additionally welded in the second stage II, by a temporary welding. In this stage, the body side outer 7 is laterally positioned by a positioning jig 25 of a four stations typed positioning apparatus 23 which has approached the transfer apparatus 3. The body side outer 7 is provided with the front inner part 13 and the wheel house rear pillar inner part 15 by temporarily welding by means of a welding robot 29 in such a manner that the inner parts 13 and 15 are positioned and set to the appropriate and predetermined portion of the body side outer 7 by other work set robots 27. The welding robot 29 and work set robots 27 are located in the opposite side of the transfer apparatus 3 to the positioning apparatus 23.

Figure 8:
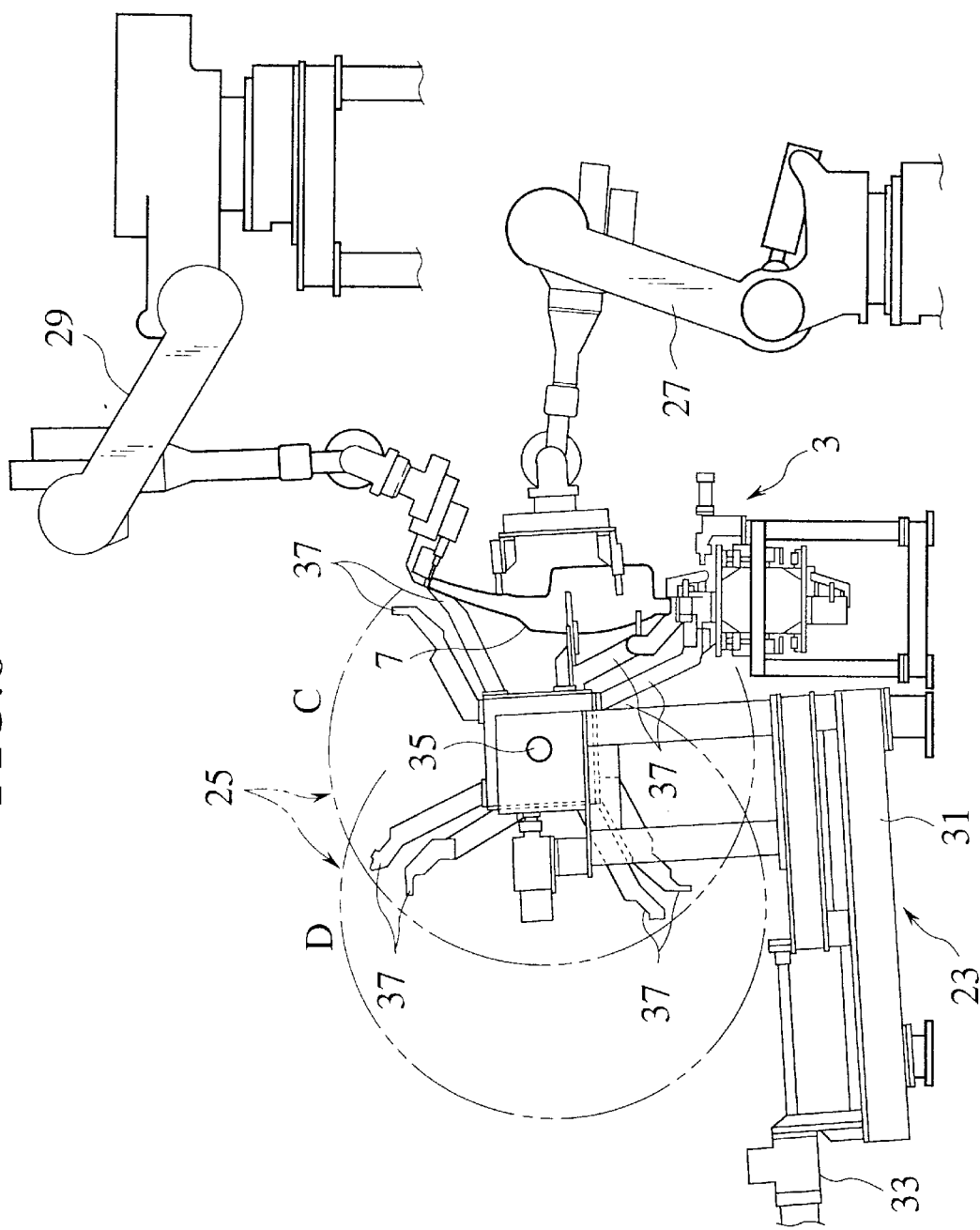
FIG. 8 is a side elevational view which shows a concrete structure of a third operation stage III in the operation stage shown in FIG. 3.

FIG. 8 shows the specific construction of the positioning apparatus 23 and corresponds to a view as seen from the second stage to a left side in FIG. 3. The positioning jig 25 is slidingly guided on a base 31 from a position shown for a dotted circle C to a position shown for a dotted circle D by an hydraulic cylinder 33. The positioning jig 25 is rotated around an axis 35 and is provided with a plurality of jig arms 37 which project from each facial station of four faces surrounding the positioning jig 25 as shown in FIG. 8 in such a manner that a plurality of different shapes of body side outer according to a plurality of different kinds of cars can be positioned by the tip portions of the jig arms 37 on the respective station.

In a fourth stage IV, which corresponds to FIG. 4, the inner parts 13 and 15 temporarily welded in the third stage III and the body side outer 7 are additionally welded by a plurality of welding robots 5 disposed in both sides of the transfer apparatus 3, and in this stage, all the welding operation is completed so that a body side outer 1 can be obtained.

Figure 9:
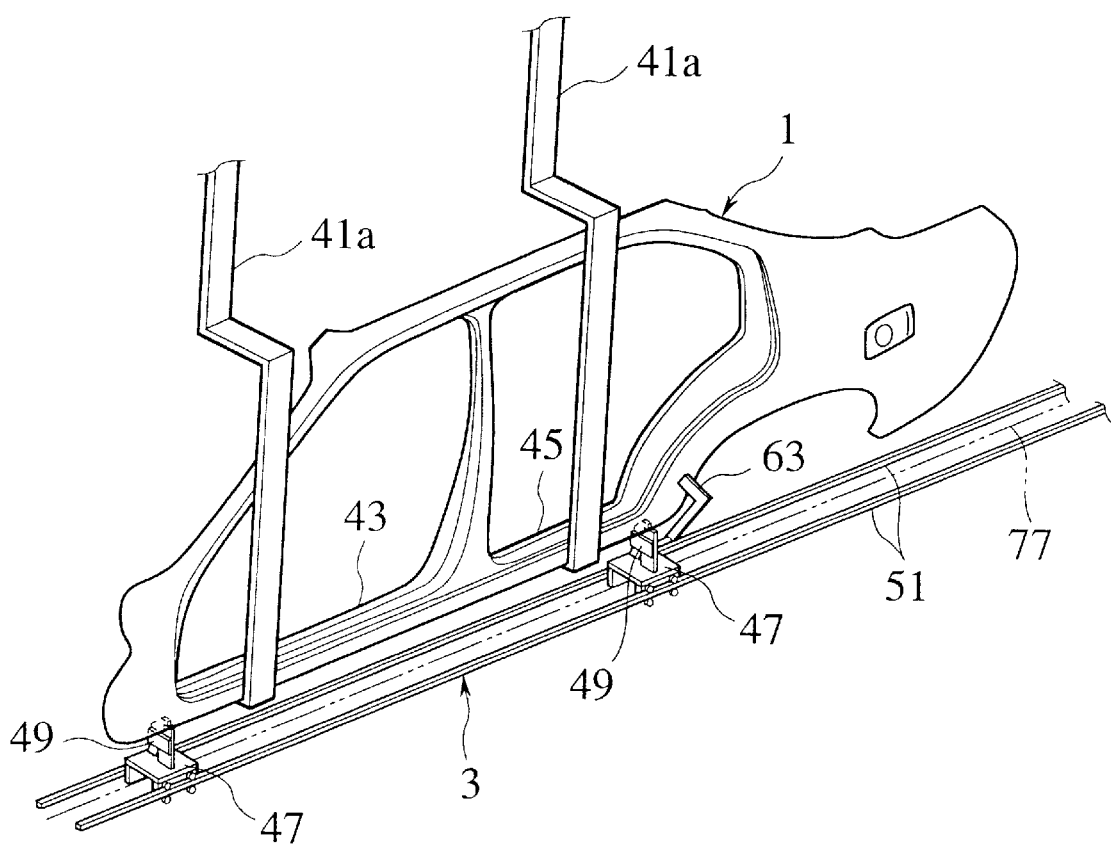
FIG. 9 is a perspective view which shows a state carrying out the body side obtained by completion of the welding operation in the assembling apparatus shown in FIG. 3.

In a fifth stage V, the body side 1 obtained in the fourth stage IV is hung up by a lifter 41, and is transferred to the following stage of the assembly line. The lifter 41 is constructed by a drop lifter in which two supporting arms.41a are hung down from an over head conveyor (not shown) so as to be capable of ascending and descending, as shown in FIG. 9, and is structured such as to hang up and carry out the body side 1 by a hook portion at a lower end of the supporting arm 41a.

As shown in FIGS. 5 and 6, the work on the transfer apparatus 3 mentioned above is transferred in an upright position that the lower ends of side sills 43 and 45, disposed at the respective lower ends of the front part 9 and the rear fender part 11, are positioned and fixed by a clamp member 49 provided on a moving body 47. The moving body 47 moves along a pair of guide rails 51 extending toward the transfer direction together with the clamp member 49.

Figure 10:
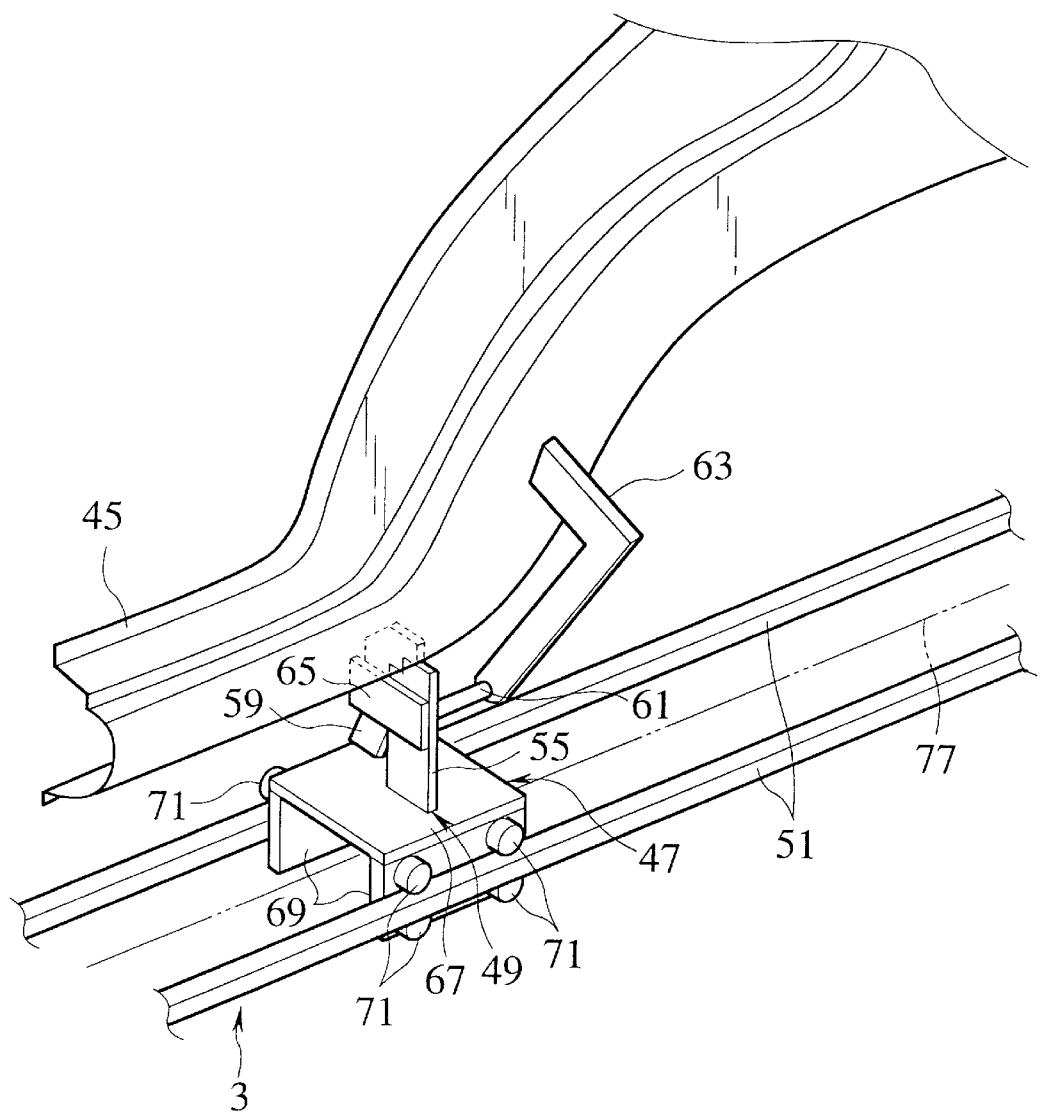
FIG. 10 is a perspective view showing a detail of a portion in which the work is clamped and transferred in the assembling apparatus shown in FIG. 4.
Figure 11:
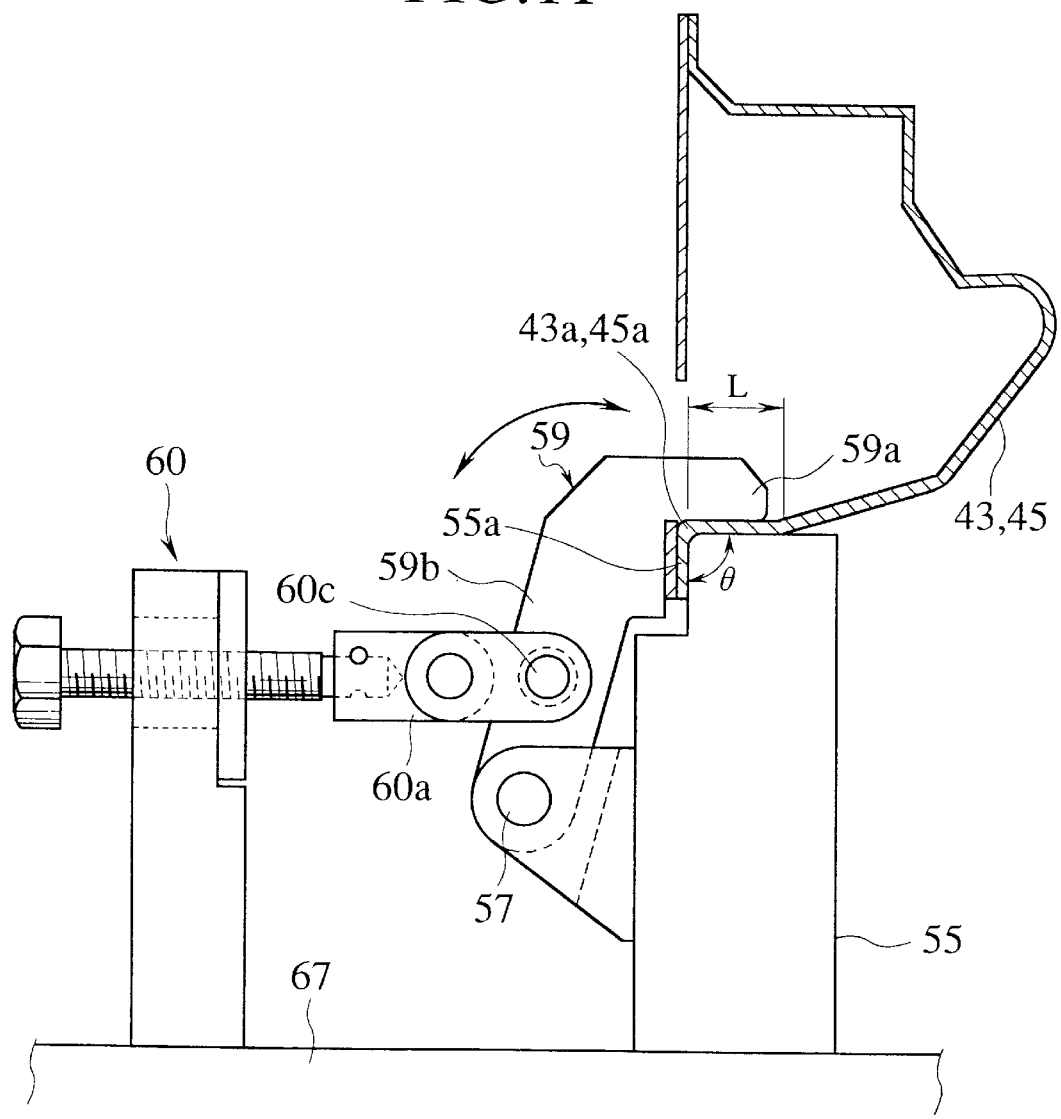
FIG. 11 is a cross sectional view which shows a detail of the clamp member shown in FIG. 10.

As shown in FIG. 10 which corresponds to an enlarged perspective view of the fixed part at the rear end in FIG. 4 to FIG. 7, the clamp member 49 is provided with a fixed plate 55 of which a lower end is fixed to the moving body 47. A movable plate 59 is swingably connected to the fixed plate 55 by an axis 57 and shapes a kind of jaw as shown in FIG. 11 which corresponds to a cross sectional view of FIG. 10. The movable plate 59 is rotatably also connected to a link members 60a by a shaft 60c at a arm portion 59a thereof. The link members 60a is rotatably connected to a bolt which is mounted to a locking block portion of a pressing mechanism 60 provided on a horizontal plate 67 of the moving body 47. In this connection, when the bolt of the locking block portion of a pressing 60 is rotated to propel in rightward in FIG. 11, the movable plate 59 is swing around the axis 57 in clockwise to clamp a bent portion 45a (43a) at the lower end of the side sill 45 (43) through a hook portion 59a and a recess portion 55a of the fixed plate 55.

The shape of the bent portion 45a (43a) of the side sill 45 (43) is set to be the same shape without relation to the kinds of cars. Concretely speaking, an angle θ and a length L in the width direction of the vehicle of the bent portion are common to the respective cars. The lower portion of the movable plate 59 is bent to the direction apart from the fixed plate 55 so as to form an operating portion 59b, and the operating portion 59b is pressed by an operating rod 60a of a pressing mechanism 60 against the spring 57 through a pin 60c from a state shown in FIG. 11. The pressing mechanism 60 is provided in a horizontal plate 67 constituting the moving body 47 as shown in the drawing, however, may be provided outward the transfer apparatus 3 so that the clamp member 49 is operated to be opened or closed from the outer portion.

As shown in FIG. 10, a work support device 63 is attached to a side portion of the fixed plate 55 through a supporting shaft 61. The work support device 63 prevents the front part 9 and the rear fender part 11 from falling in a state of inclining the respective parts 9 and 11 to the side opposite to the inner parts mounting end rather than a state of clamping the respective parts 9 and 11 by the clamp member 49 at a time of setting the front part 9 and the rear fender part 11 on the transfer apparatus 3 in the first stage P. The clamp member 49 is stood up to a normal upright position (a clamp position) apart from the work support device 63 by a servo motor (not shown) disposed outward the transfer apparatus 3, and then clamps the work. A guide plate 65 is fixed to the both side portions of the fixed plate 55 and guides the movable plate 59.

In FIG. 9, the work support device 63 is provided only in the side of rear fender part 11 which is heavier than the front part 9, however, if it is necessary, in addition to the rear fender part 11 end, the work support device may be provided in the side of the front part 9.

The clamp member 49 mentioned above respectively positions the work in the lateral direction and the vertical direction perpendicular to the transfer direction A of the work. The positioning in the transfer direction is performed by forming a notch 45b (43b) on the lower end of the side sill 45 (43) and inserting a positioning projection 47a provided in the moving body 47 into the lower end of the notch 45b (43b).

The moving body 47 moving on the guide rail 51 is constituted by the horizontal plate 67, a side plate 69 an upper end of which is fixed to the lower portion of both ends in the lateral direction facing the transfer direction of the horizontal plate 67, and a cam follower 71 comprising a roller rotatably mounted to the outer portion of the side plate 69. Two cam followers 71 are respectively mounted to the front portion and the rear portion of each of the side plates 69 in such a manner as to hold the guide rail 51 therebetween.

Figure 13A:
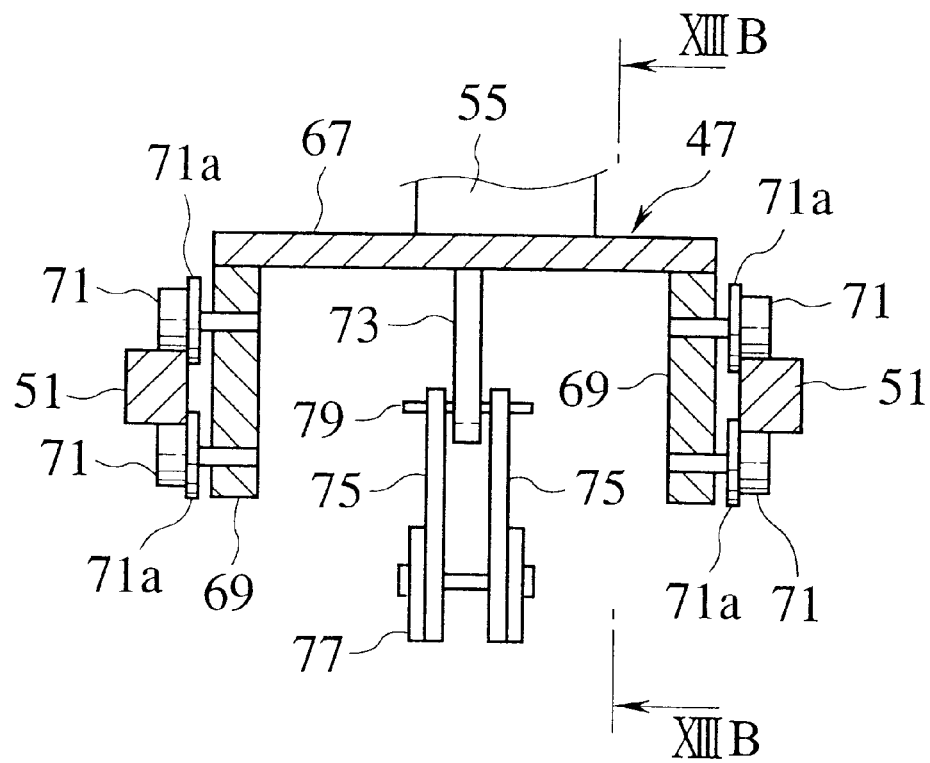
FIG. 13A is a cross sectional view along a perpendicular line with respect to the transfer direction of the moving body shown in FIG. 10.

FIG. 13A is a cross sectional view along a perpendicular line with respect to the transfer direction of the moving body 47 in the portion in which the cam follower 71 is mounted. A flange 71a is formed on the inner end portion of each of the cam followers 71, and the displacement of the moving body 47 in the lateral direction and the vertical direction in FIG. 13A are both restricted by positioning the flange 71a to the inner portion of the guide rail 51.

Figure 13B:
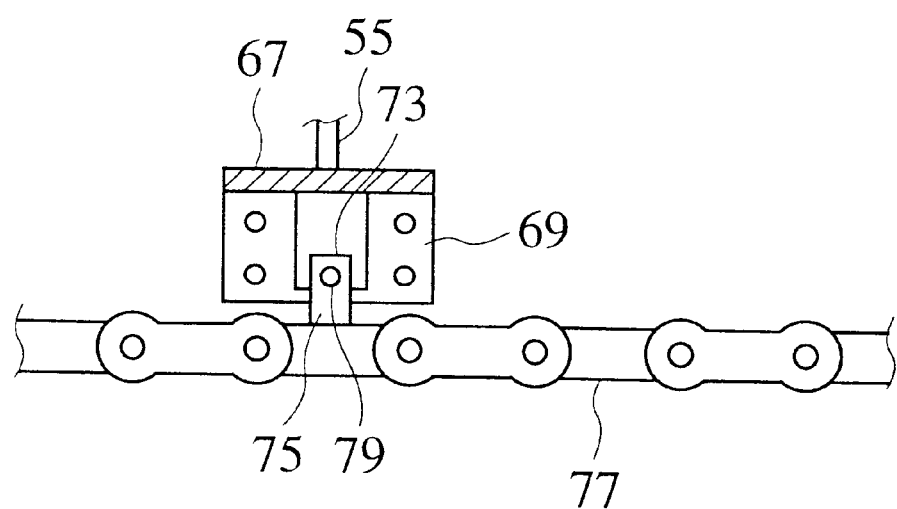
FIG. 13B is a cross sectional view along a line XIIIB—XIIIB in FIG. 13A.

An upper end of a chain mounting portion 73 is fixed to the lower surface of the horizontal plate 67 in the moving body 47, and a chain 77 is attached to the lower end of the chain mounting portion 73 through an attachment 75 as shown in FIG. 13B which corresponds to a cross sectional view along a line XIIIB—XIIIB of FIG. 13A. The chain mounting portion 73 and the attachment 75 can be rotated around a pin 79.

Figure 14:
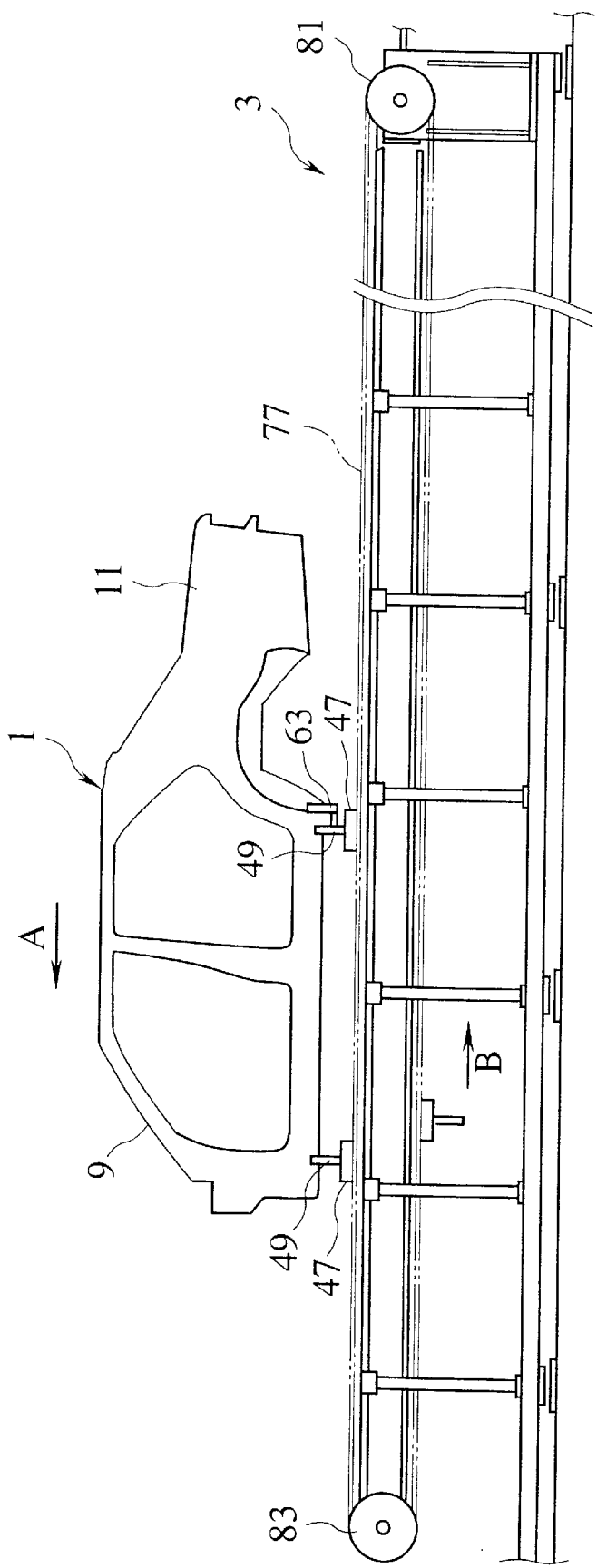
FIG. 14 is a front view which shows a total structure of the transfer apparatus in the assembling apparatus shown in FIG. 4.

The transfer apparatus 3 constituted by the chain 77, the moving body 47 and the guide rail 51 moves to the direction shown by an arrow A in the drawing by winding the chain 77 between sprockets 81 and 83 at both ends, as shown in FIG. 14 which corresponds to a side elevational view of the total structure.

Next, an operation of the transfer apparatus for transferring the body side of the automotive vehicle will be described below. In the first stage I of the process drawing in FIG. 3, the front part 9 and the rear fender part 11 are set on the transfer apparatus 3 by the work setting robot 16 in a state of placing the connecting portions K opposite.

Figure 12:
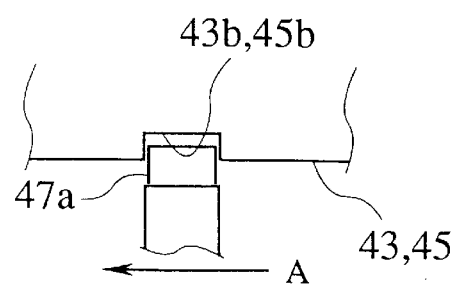
FIG. 12 is a view which shows a positioning mechanism for positioning the work in the transfer direction in the assembling apparatus shown in FIG. 4.

At this time, the clamp member 49 is in a state that the operating portion 59b of the movable plate 59 is pressed and the clamp portion is released. Accordingly, the set parts 9 and 11 is inserted into the clamp portion in the released state in the lower end of the side sills 43 and 45. Further, as shown in FIG. 12, the positioning in the transfer direction is laterally positioning the whole body side outer 7. After the inner parts 13 and 15 are set to the body side outer 7 by the work set robot 27, the inner parts 13 and 15 are temporarily welded to the body side outer 7 by the welding robot 29.

After the third stage R is completed, the body side outer 7 to which the inner parts 13 and 15 are temporarily welded is further moved to the fourth stage IV by driving through the transfer apparatus 3. In the fourth stage IV, as shown in FIG. 3, the body side outer 7 is completely welded by the welding robots 5 located on both sides of the transfer apparatus 3, and the all welding operations are completed, then the body side 1 is finally produced.

In the following fifth stage V, the body side 1 obtained in the fourth stage S is transferred by driving the transfer apparatus 3, and the transferred body side 1 is hung up by the supporting arm 41*a* of the lifter 41, as shown in FIG. 9, so as to be carried out to the following stage.

Figure 15:
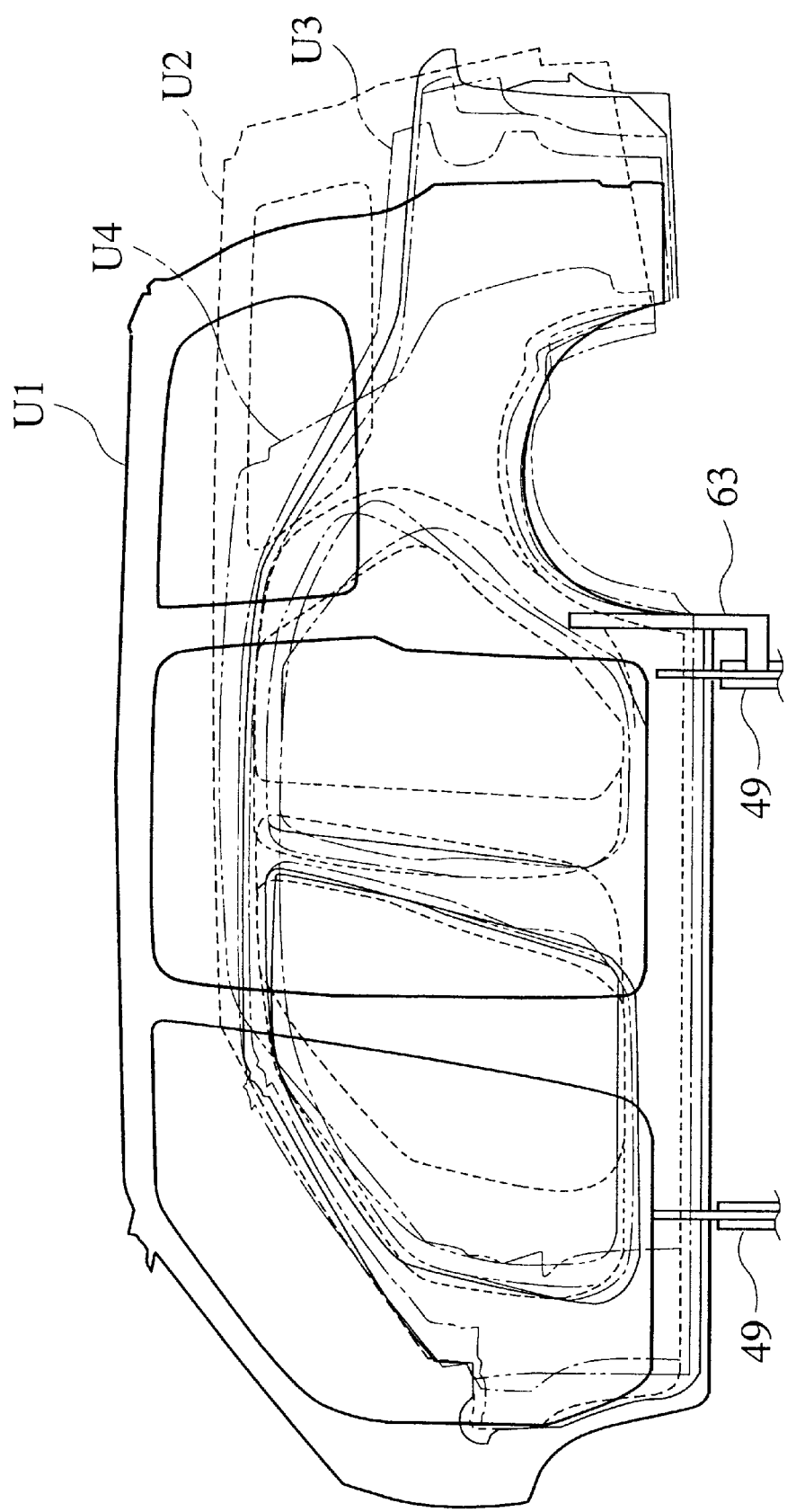
FIG. 15 is a schematic view which shows a clamping operation by means of the clamp member in the assembling apparatus shown in FIG. 4 with respect to a plurality of different kinds of cars.

In the side sills 43 and 45, as shown in FIG. 11, since an angle θ at the bent portions 43*a* and 45*a* in the lower end and a length L in the width direction of the vehicle is set to be the same without relation to the kinds of cars, the clamp member 49 can,clamp a plurality of different kinds of cars U1, U2, U3 and U4 in an upright position as shown in FIG. 15, so that the exclusive jig is not necessary for each of the cars and the clamp member 49 can be made simple. Further, since the conveyor using an inexpensive chain 77 is used as the transfer apparatus 3 used for transferring the work, it is possible to largely reduce the provision cost.

At the second and fourth stages II and IV, according to the welding operations by the welding robots 21 and 5 which are located on the both sides of the transfer apparatus 3, a plurality of welding operations can be simultaneously proceeded without any jamming between the welding robots 21 and between the welding robots 5. Therefore, any interlock waiting time is not necessitated, full operation area can be used. Thereby, the robot size can be reduced, the welding speed is increased, the performed by inserting a positioning projection 47*a* into the notches 43*b* and 45*b* at the lower end of the side sills 43 and 45. In this state, the respective parts 9 and 11 are inclined to this end with respect to the paper surface of FIG. 5 rather than the upright position at a time of normal welding operation, and the inclined state is held by the work support device 63 supporting the rear fender part 11. As to the front part 9, since it is lighter than the rear fender part 11, it is supported by the rear fender part 11 in the connecting portion K.

When the respective parts 9 and 11 held by the work support device 63 are pressed from this end with respect to the paper surface of FIG. 5 by the servo motor (not shown) and the like so as to be stood up, and the pressing operation with respect to the operating portion 59*b* in the clamp member 49 is removed, the bent portion 43*a* and 45*a* of the lower end of the side sills 43 and 45 are held and fixed therebetween as shown in FIG. 11. Accordingly, the respective parts 9 and 11 can be positioned in the lateral direction and the vertical direction with respect to the transfer direction. After positioning, the connecting portion K between the respective parts 9 and 11 is joined by welding by means of the welding robot 17 so as to obtain the body side outer 7.

When the first stage I is completed, the transfer apparatus 3 is driven so as to move the chain 77 to the direction of the arrow A in FIG. 14. Then, the body side outer 7 is transferred to the same direction together with the moving body 47 so as to be moved to the second stage II. In the second stage II, the additional welding operation is given to the body side outer 7 obtained in the first stage I by the welding robot 21 disposed in both sides of the transfer apparatus 3.

After the second stage II is completed, the transfer apparatus 3 is driven in the same manner as that mentioned above so as to move the body side outer 7 to the third stage III. In the third stage III, the positioning jig 25 of the positioning apparatus 23 is moved from the dotted circle D as a retract position to the dotted circle C as a progress position for operation steps can be reduced and the efficiency of the welding operation is elevated.

Figure 2A:
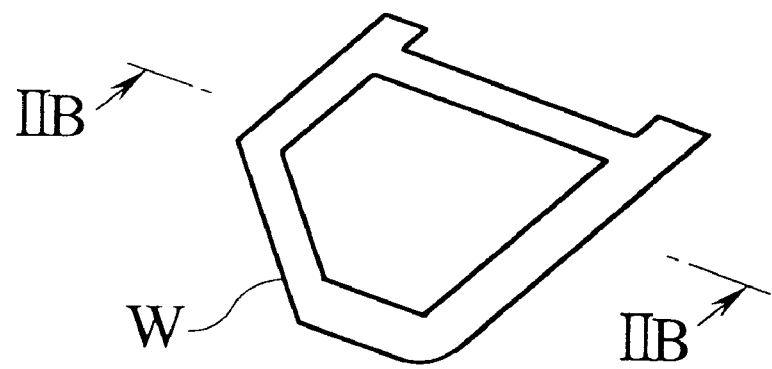
FIG. 2A is a view showing a part to be worked which is set on the body side assembling apparatus shown in FIG. 1.
Figure 2B:
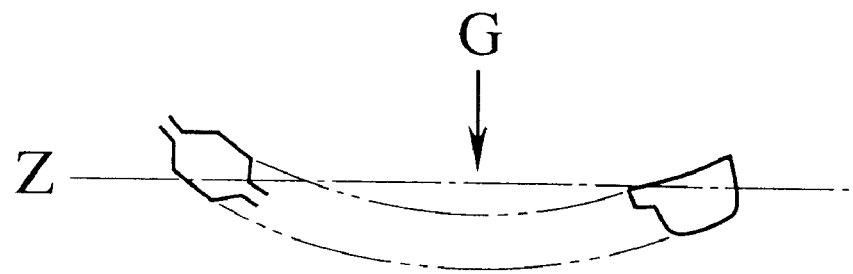
FIG. 2B is a cross sectional view along a line IIB—IIB in FIG. 2A which shows an example of the part to be worked in a bending state.
Figure 16A:
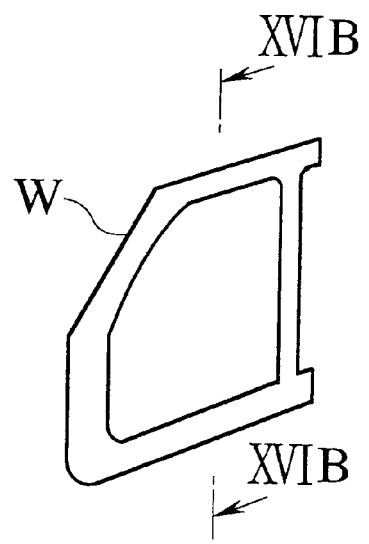
FIG. 16A is a schematic view of a work in an upright position.
Figure 16B:
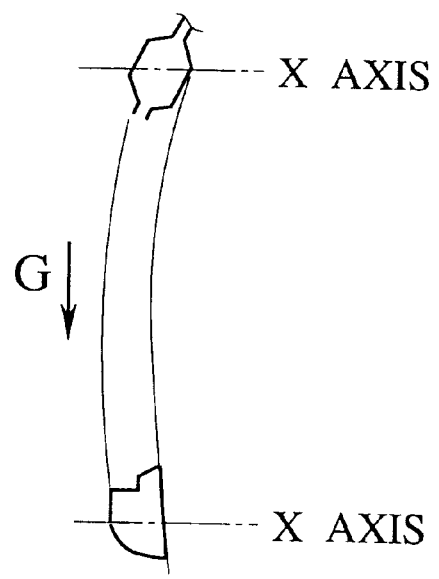
FIG. 16B is a cross sectional view along a line XVIB—XVIB shown in FIG. 16A which shows the work due to the own weight in a state of FIG. 16A.

FIGS. 16A and 16B show a slack due to its own weight of the work W when the work W corresponding to the front part of the body side outer is in an upright position applied to the present invention, and FIG. 16B is a schematic cross sectional view along a line XVIB—XVIB shown in FIG. 16A showing the work attitude. On the contrary, FIGS. 2A and 2B show a slack due to its own weight of the work W when the work W is in a laying down state which is applied to the embodiment of the related art, and FIG. 2B is a schematic cross sectional view along a line IIB—IIB shown in FIG. 2A showing the work attitude.

In the case of FIGS. 16A and 16B in which the work is stood up, a cross sectional secondary moment around an X axis is large and a bending rigidity becomes large so that the slack deformation due to the gravity G becomes small. On the contrary, in FIGS. 2A and 2B in which the work is laid down, a cross sectional secondary moment around a Z axis is small and the bending rigidity becomes small so that the slack deformation due to the gravity becomes large.

As mentioned above, in accordance with the present invention, since the work is transferred and welded in a state that the work is stood up corresponding to the state that bending, rigidity of the work cross section becomes maximum with respect to the operating direction of its own weight of the work, the work is hard to be deformed in comparison with the state that the work is laid down, so that the accuracy is improved. Further, since the work is in the upright position, the space for operating can be reduced.

In carrying out the body side 1 in the final fifth stage V, since the conventional apparatus for standing up the body side from the laying down state is not required, the provision cost can be reduced.

Figure 17:
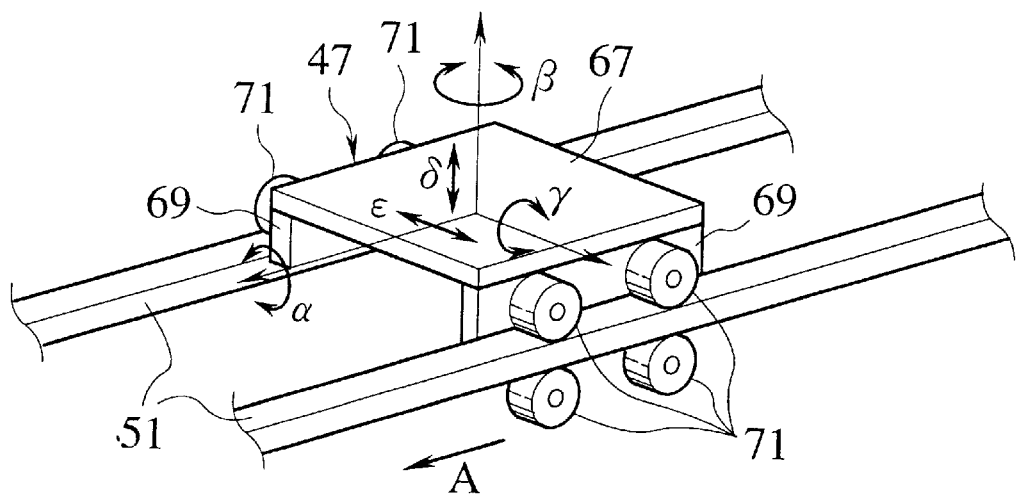
FIG. 17 is a schematic view which shows a displacement operation of the moving body shown in FIG. 10.

In the transferring apparatus 3, since eight cam followers 71 mounted to the moving body 47 are disposed in such a manner as to hold the upper and lower portions of the guide rail 51 and restrict the lateral displacement by the flange 71*a* as shown in FIG. 13A, the displacement α around the axis in the transfer direction A, the displacement β around the axis in the vertical direction, the displacement γ around the axis in the lateral direction perpendicular to the transfer direction A, the displacement δ in the vertical direction and the displacement ε in the lateral direction with respect to the transfer direction A are all restricted as shown in FIG. 17, so that the vibration and the motion in the zigzag direction of the work during transferring can be securely prevented. Further, at a time of welding, since the positioning accuracy is improved, the welding with a high accuracy can be performed.

Further, since the load of the work is received by the guide rail 51 through the horizontal plate 67, the side plate 69 and the cam follower 71 of the moving body 47 from the fixed plate 55 of the clamp member 49, as shown in FIG. 13A and does not affect to the chain 77, the chain 77 is prevented from extending so as to achieve the vibration prevention and the long life. Still further, the inexpensive chain can be used for this chain, thereby achieving the cost reduction.

Since the chain 77 is structured such as to be hung by the moving body 47, thereby preventing the hanging down, the guide shoe or the sprocket for holding the chain is not required, and the impact due to the slack of the chain at a time of starting or stopping can be prevented.

Figure 18:
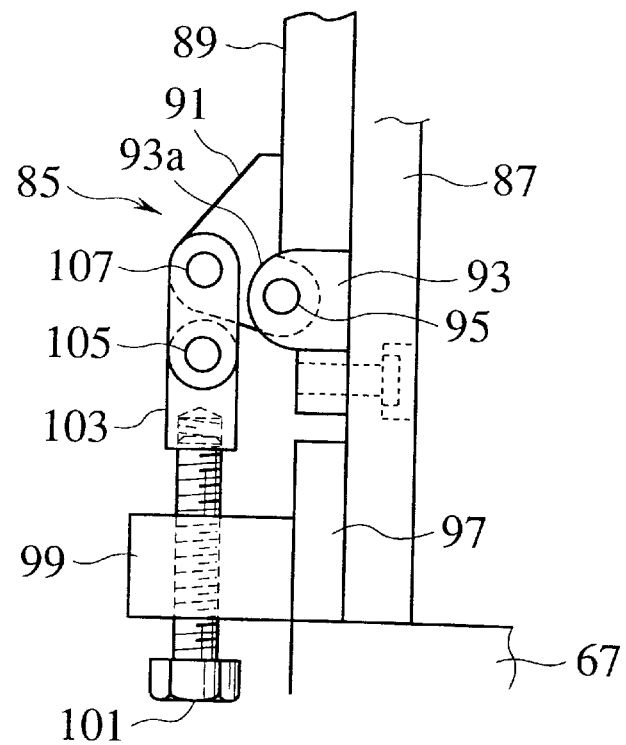
FIG. 18 is a cross sectional view which shows another embodiment of the clamp member shown in FIG. 11.

FIG. 18 shows another embodiment of the clamp member shown in FIG. 11. A clamp member 85 is provided with a fixed plate 87 provided on the moving body 47 shown in FIG. 8 and a rotating plate 91 for holding and fixing a flange 89 of the work corresponding to the lower end of the side sills 43 and 45 of the front part 9 or the rear fender part 11 with respect to the fixed plate 87. The lower end of the flange 89 is positioned by being brought into contact with an upper end of a positioning plate 93 provided on the side of the fixed plate 87 in the vertical direction. A rotation supporting flange 93a is formed on the positioning plate 93, and the rotating plate 91 is rotatably supported to the rotation supporting flange 93a through a rotation supporting pin 95.

On the contrary, in the lower portion of the rotating plate 91, a nut 99 is fixed to the side portion of the lower end of the fixed plate 87 through a middle member 97, and a connecting member 103 is fixed to a front end of a screw 101 screwed to the nut 99 from the downward portion. The upper end of the connecting member 103 and the rotating plate 91 are rotatably connected to each other through connecting pins 105 and 107.

In the structure shown in FIG. 18, since the screw 101 is screwed upward with respect to the nut 99, the rotating plate 91 rotates in the clockwise direction in the drawing around the rotation supporting pin 95 so as to hold and fix the flange 89 with respect to the fixed plate 87, thereby positioning in the lateral direction and the vertical direction with respect to the transfer direction of the work.

Figure 19:
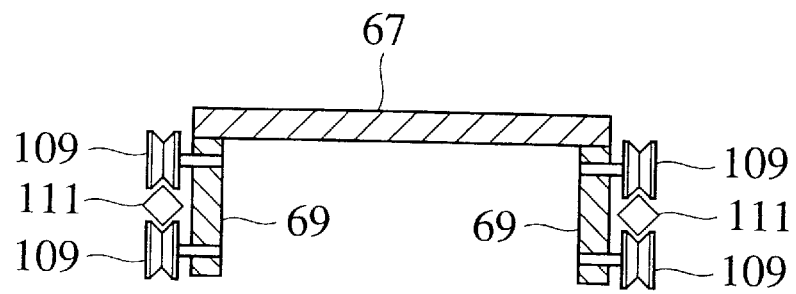
FIG. 19 is a cross sectional view which shows another embodiment of a displacement restricting structure of the moving body in FIG. 13A.
Figure 20:
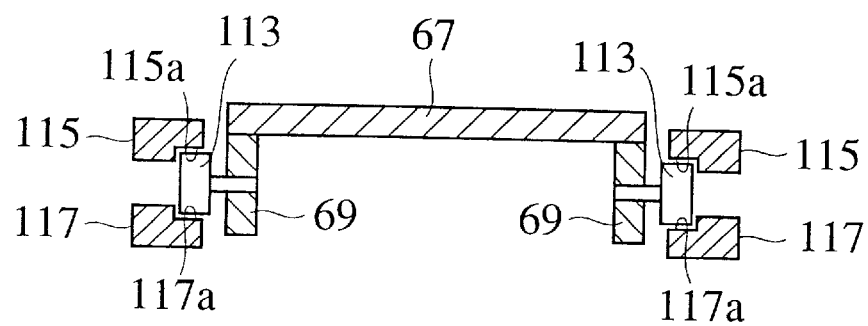
FIG. 20 is a cross sectional view which shows still another embodiment of the displacement restricting structure of the moving body in FIG. 13A.
Figure 21:
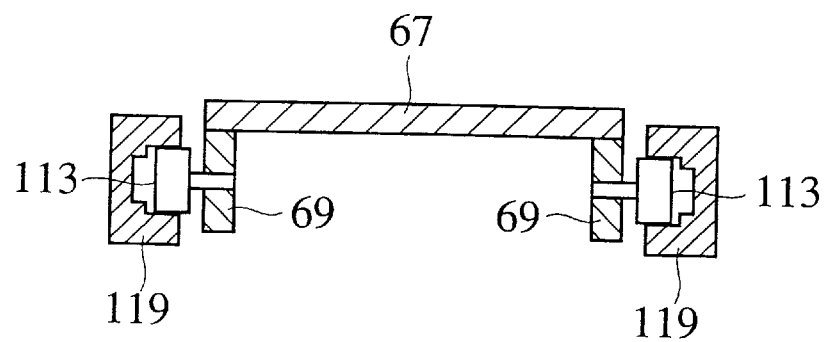
FIG. 21 is a cross sectional view which shows a modified embodiment of the displacement restricting structure of the moving body in FIG. 20.

FIGS. 19 to 21 show the other embodiment of the cam follower and the guide rail structure in the transfer apparatus 3. In the embodiment shown in FIG. 19, eight cam followers 109 are used as in the same manner as that of FIG. 13A and are disposed to hold a guide rail 111 between the upper and lower portions, however, in this case, a shape of the cam follower 109 is a pulley shape having a V-shaped groove in a central portion and the guide rail 111 is disposed in such a manner as to align with the V-shaped groove.

FIG. 20 shows a structure in which a cam follower 113 is respectively provided in a front and rear portions of a right and left side plates 69 in the transfer direction, and these four cam follower 113 are disposed in such a manner as to be held in the upper and lower portions by guide rails 115 and 117 vertically separated, in the right and left portions. Notch recess portions 115a and 117a are respectively formed on the guide rails 115 and 117, and the cam follower 113 is inserted into the respective notch recess portions 115a and 117a for movement.

FIG. 21 shows a structure in which the cam follower 113 has the same structure as that of FIG. 20, the guide rails 115 and 117 in FIG. 20 are integrally formed to make a guide rail 119.

In the embodiments shown in FIGS. 19 to 21, as in the same manner as that shown in FIG. 13A, since the moving body 47 is held in a state of restricting the displacement with respect to the guide rails 111, 115, 117 and 119 through the cam follower 109 and 113, the transferring operation can be stably performed, and the welding operation can be performed with a high accuracy.

Figure 22:
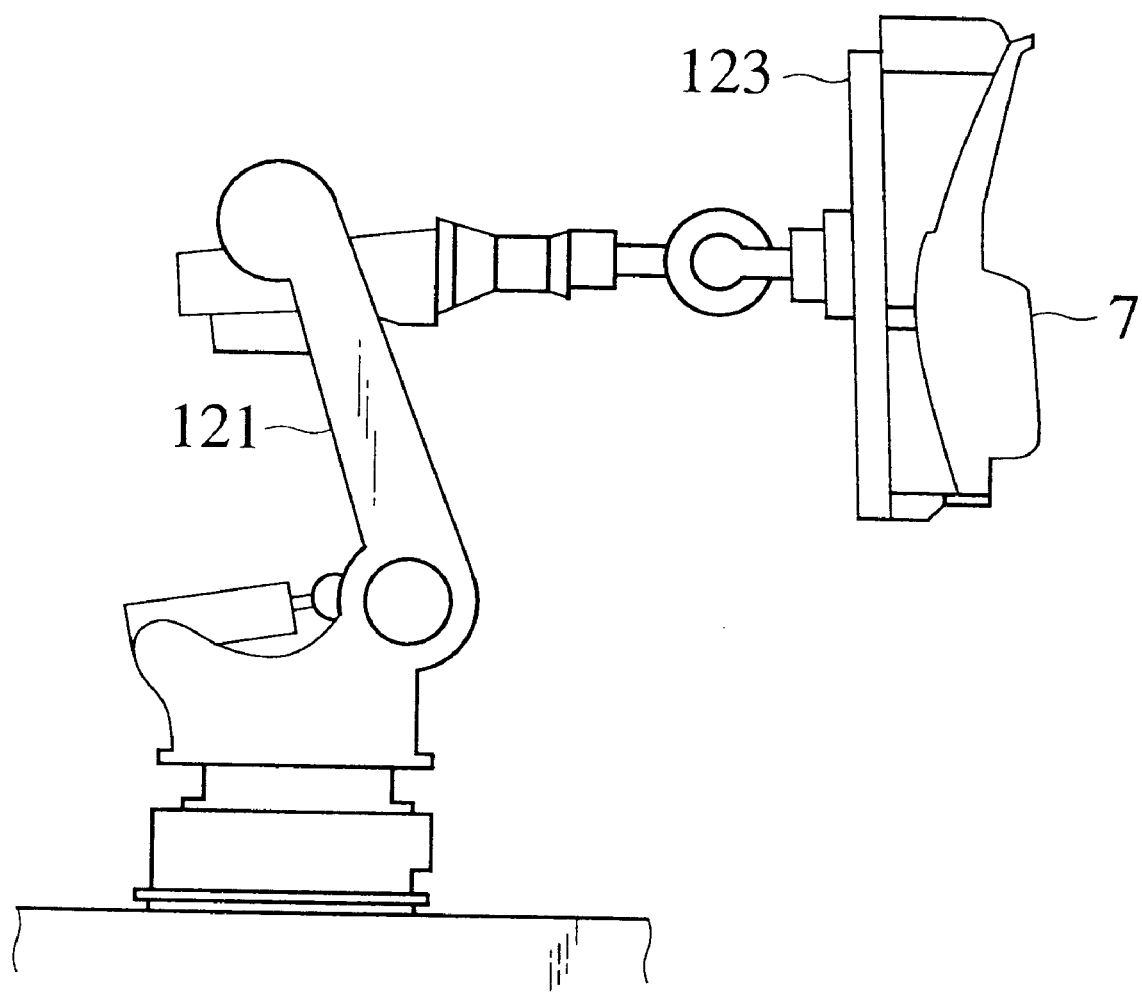
FIG. 22 is a schematic view which shows an operation of positioning a work by means of a positioning robot in place of an apparatus for positioning a tetrahedron used in a working process in FIG. 6.

On the other hand, in the third stage shown in FIG. 3, a robot hang jig changeably provided with each specific jig 123 for the plurality of different kinds of cars can be used as shown in FIG. 22, instead of the positioning apparatus 23 of the preferred embodiments where the body side outer 7 is laterally positioned and temporarily welded with the inner parts 13 and 15.

In other words, a temporary welding operation of the inner parts 13 and 15 is performed in a state of positioning the body side outer 7 from the side surface by means of the positioning apparatus 23, however, in place of the positioning apparatus 23, as shown in FIG. 22, a robot hand type jig in which a specific jig 123 for each of vehicle kinds for positioning the body side outer 7 is mounted at the tip end of the robot hand of the positioning robot 121 in a replaceable manner may be employed.

Figure 23:
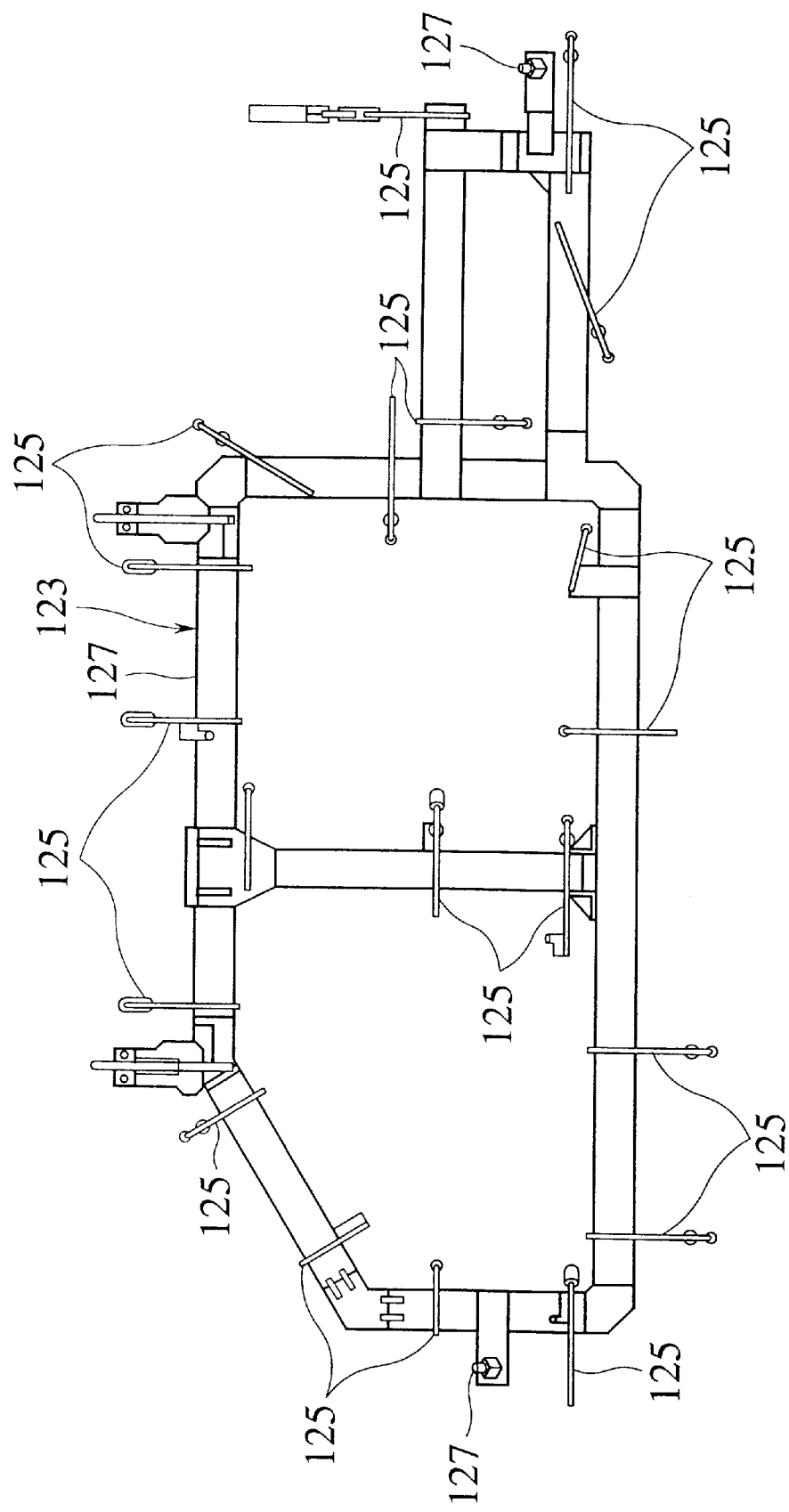
FIG. 23 is a front elevational view of a positioning jig at a front end of a robot hand in the positioning robot shown in FIG. 22.
Figure 24:
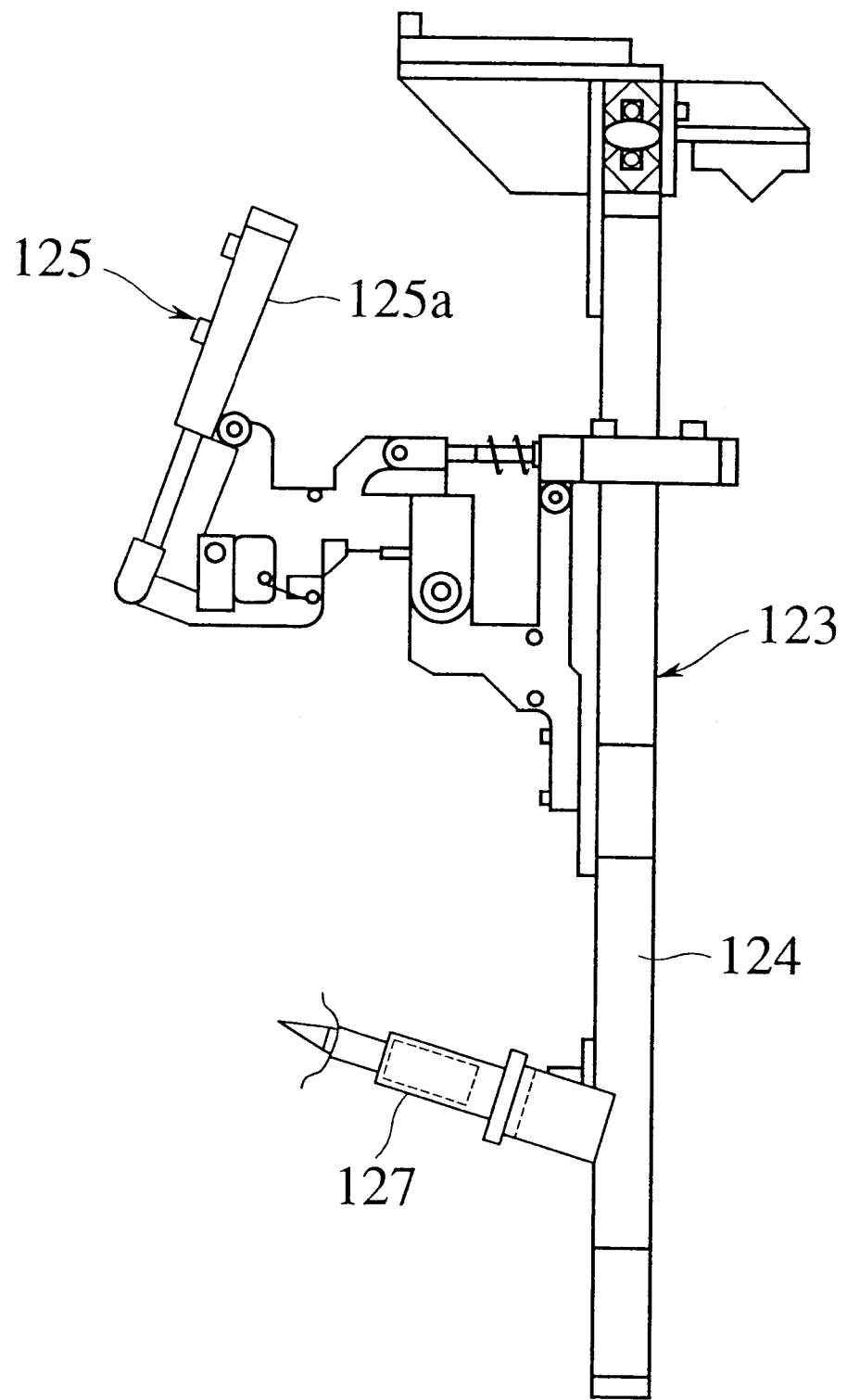
FIG. 24 is an enlarged rightward side elevational view of FIG. 23.

FIG. 23 is a front elevational view as seen from a work end of the jig 123, the jig 123 has a frame body 124 aligned with the shape of the side surface of the body side outer 7, and a plurality of work clamping gauges 125 are provided at a predetermined portion of the frame body 124. The work clamping gauge 125 is structured such as to clamp and hold in accordance with an operation of a cylinder 125a, as shown in FIG. 24 corresponding to a schematically enlarged right side view of FIG. 23. Reference numeral 127 in FIGS. 23 and 24 denotes a positioning locate pin.

In this case, the positioning robot 121 is disposed at the opposite side to the positioning apparatus 23 in the process view shown in FIG. 3 with respect to the transfer apparatus 3. Namely, the body side outer 7 according to the embodiment along to FIGS. 3 to 10 is to be mounted in the left side of the vehicle body. On the contrary, in this embodiment, a body side outer 7 to be mounted in the right side of the vehicle body is treated. Accordingly, the inner face and the outer face of the body side outer 7 constructed by the front part 9 and the rear fender part 11 are inverted each other on the transfer apparatus 3.

Figure 25:
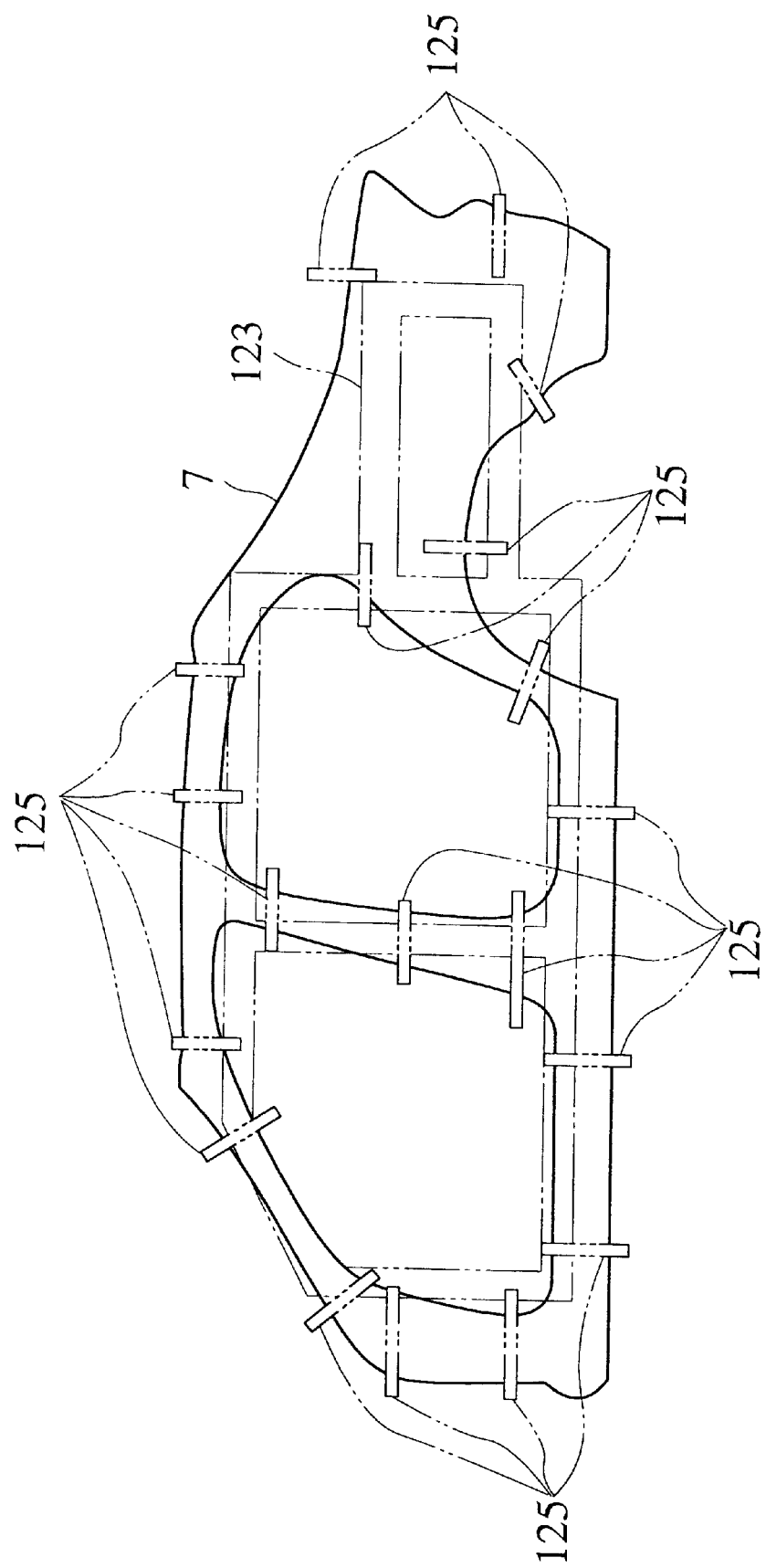
FIG. 25 is a side elevational view of a work which shows a portion positioned by the positioning robot shown in FIG. 22.
Figure 26:
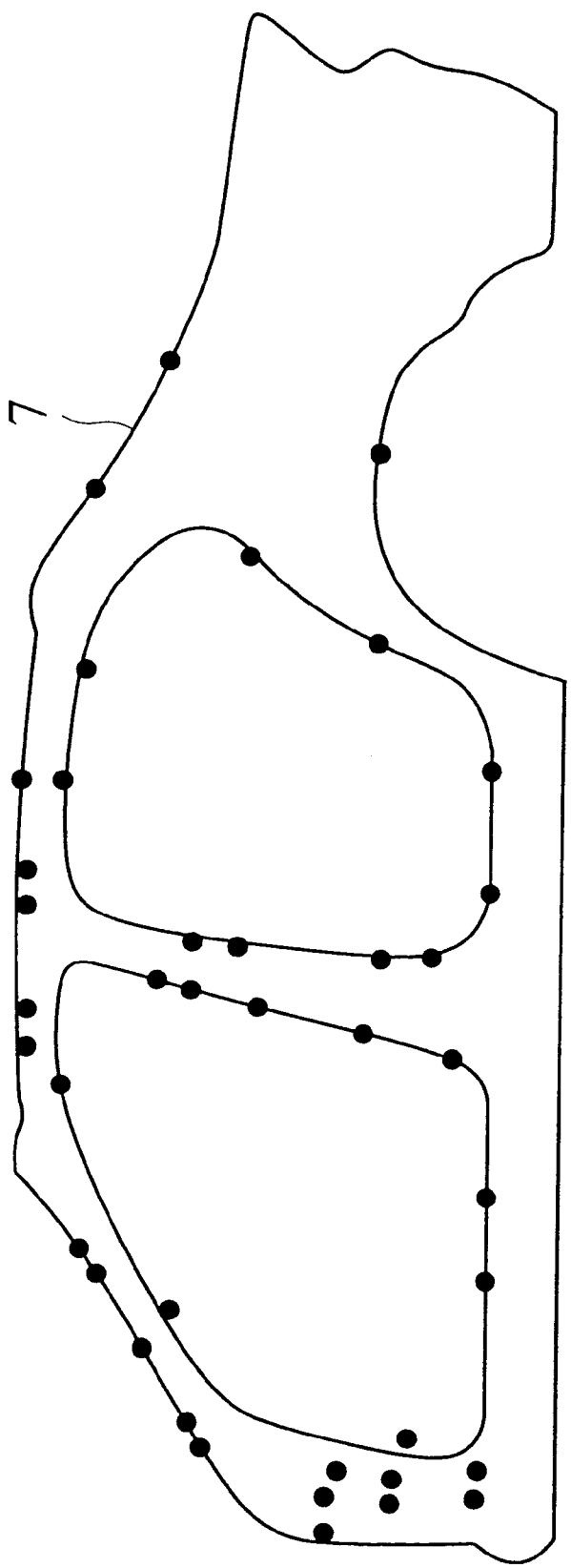
FIG. 26 is a schematic view which shows a point to be welded of the work.

FIG. 25 shows a portion clamped by the work clamping gauge 125 in the body side outer 7 by a broken line. FIG. 26 shows a welding point with respect to the clamped portion in FIG. 25 by black dots.

Figure 27:
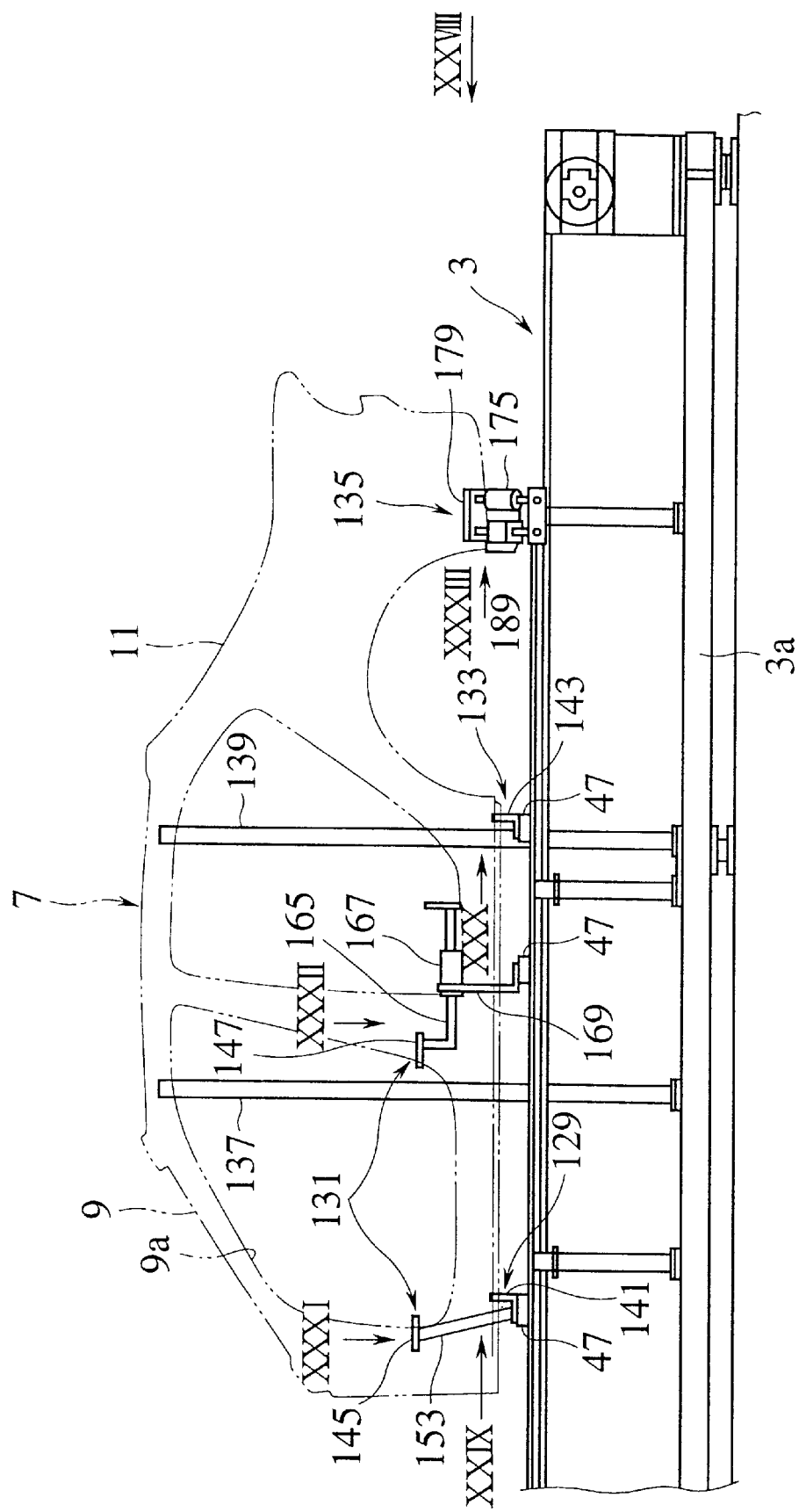
FIG. 27 is a side elevational view showing a state in which a work is set on a transfer apparatus in an assembling apparatus for assembling a body side for an automotive vehicle in accordance with the other embodiment of the present invention.
Figure 28:
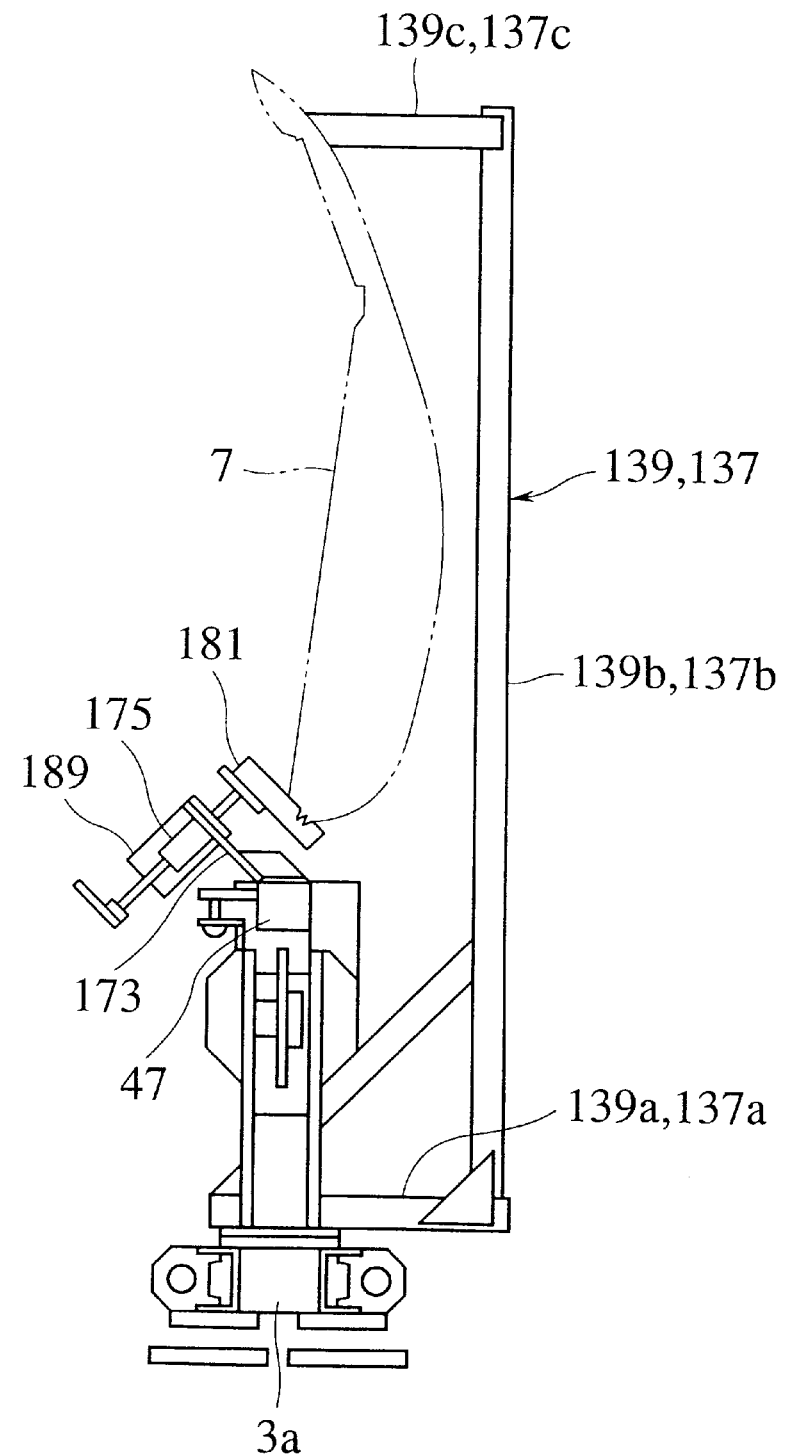
FIG. 28 is an enlarged view as seen from an arrow XXVIII of FIG. 27.

Referring now to FIGS. 27 to 34, still another embodiment according to the present invention will be explained hereinafter. FIG. 27 shows a structure in which a lower end of the body side outer 7 is positioned by positioning portions 129, 131, 133 and 135 disposed at four portions on the transfer apparatus 3 in the assembling apparatus for assembling a body side of an automotive vehicle. FIG. 28 is an enlarged view as seen from an arrow XXVIII in FIG. 27. In this case, the body side outer 7 is to be mounted in the right side of the vehicle body in the same manner as the former embodiment by the positioning robot 121 described above.

The body side outer 7 shown in FIG. 27 corresponds to the first step I in FIG. 3, and at this position, the front part 9 and the rear fender part 11 are supported by supporting arms 137 and 139 fixed to the transfer apparatus 3 from a back surface side of the paper on which the FIG. 27 is drawn. As shown in FIG. 28, the supporting arms 137 and 139 have lower horizontal rods 137a and 139a fixed at an end thereof to the base portion 3a of the transfer apparatus 3, vertical rods 137b and 139b connected at a bottom end thereof to the other end of the lower horizontal rods 137a and 139a, and upper horizontal rods 137c and 139c connected to the upper end of the vertical rods 137b and 139b. The supporting arms 137 support each of the roof rail portions of the front part 9 and the rear fender part 11 at the tip end of the upper horizontal rods 137c and 139c.

Figure 29:
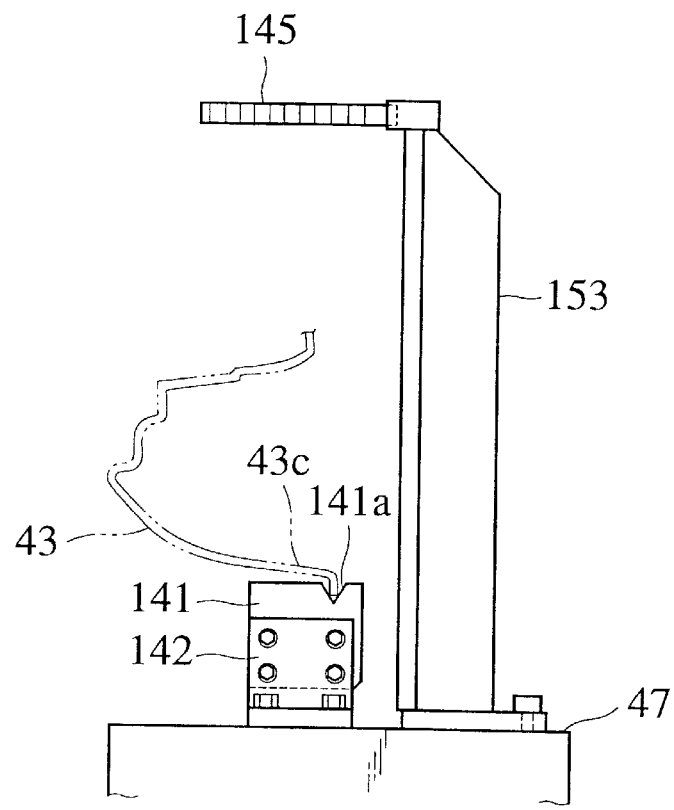
FIG. 29 is an enlarged view as seen from an arrow XXIX of FIG. 27.

FIG. 29 is an enlarged view as seen from an arrow XXIX of FIG. 27 which shows the positioning portion 129. A side sill receiver 141 with a V-shaped recess portion 141a is fixed on the moving body 47 through an L-shaped mounting device 142. In this construction, by inserting a flange lower end 43c of the side sill 43 to the recess portion 141a of the side sill receiver 141, the front part 9 is positioned in a vertical direction.

Figure 30:
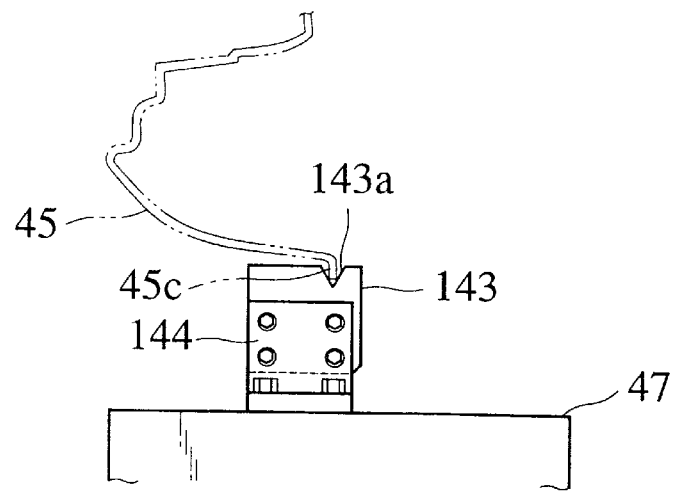
FIG. 30 is an enlarged view as seen from an arrow XXX of FIG. 27.

FIG. 30 is an enlarged view as seen from an arrow XXX of FIG. 27 which shows the positioning portion 133. A side sill receiver 143 with a V-shaped recess portion 143a having the same structure as that of the side sill receiver 141 is fixed on the moving body 47 through an L-shaped mounting device 144. In this construction, by inserting the flange lower end 45c of the side sill 45 to the recess portion 143a of the side sill receiver 143, the rear fender part 11 is also positioned in the vertical direction.

Figure 31:
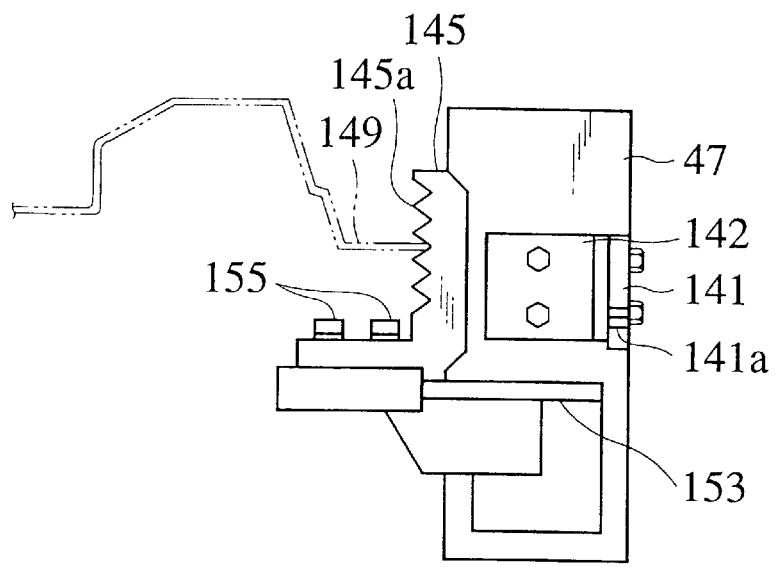
FIG. 31 is an enlarged view as seen from an arrow XXXI of FIG. 27.
Figure 32:
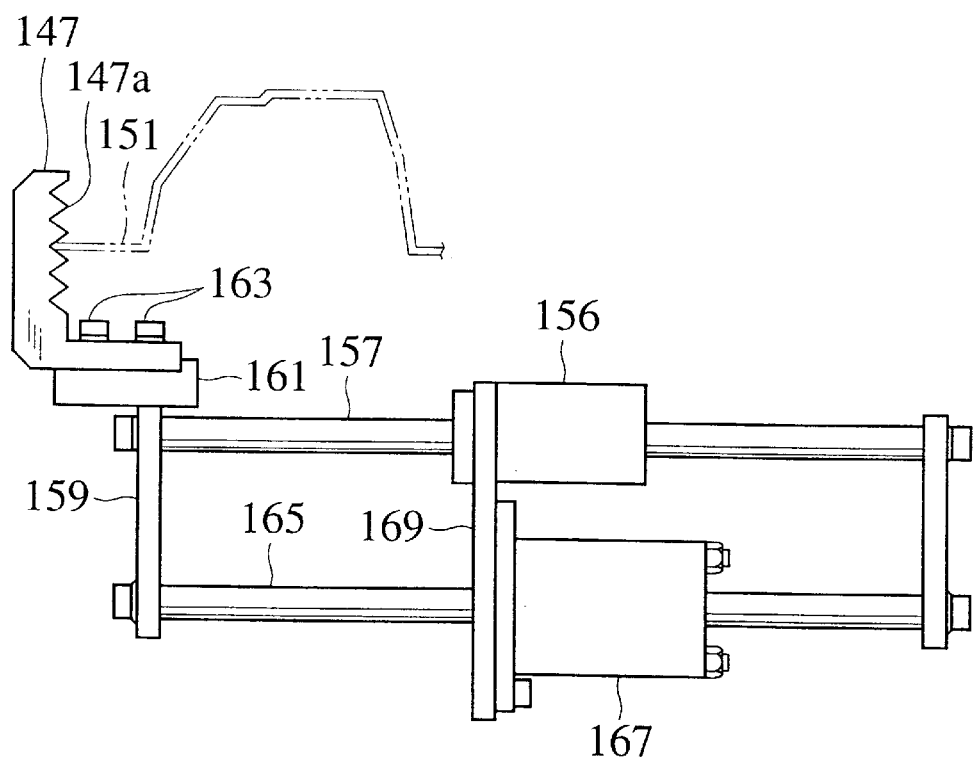
FIG. 32 is an enlarged view as seen from an arrow XXXII of FIG. 27.

The positioning portion 131 comprises a front side pressing portion 145 and a rear side pressing portion 147 respectively pressing a front side and a rear side of an inner peripheral edge of the front door opening portion 9a, as shown in FIG. 31 corresponding to an enlarged view as seen from an arrow XXXI of FIG. 27 and FIG. 32 corresponding to a view at seen from an arrow XXXII of FIG. 27. The front side pressing portion 145 is provided with a saw tooth 145a extended in a lateral direction perpendicular to the transfer direction at the front side in the transfer direction, and a flange 149 at the front side in the inner peripheral edge enters to a predetermined portion of the saw tooth 145a. On the contrary, the rear side pressing portion 147 is provided with a saw tooth 147a extended in a lateral direction perpendicular to the transfer direction at the rear side in the transfer direction, and a flange 151 at the rear side in the inner peripheral edge enters to a predetermined portion of the saw tooth 147a.

The front side pressing portion 145 is fixed to an upper end of a supporting bracket 153 fixed in such a manner as to be adjacent to the side sill receiver 141 on the moving body 47 in the positioning portion 129 shown in FIG. 29 by means of a bolt 155. On the contrary, the rear side pressing portion 147 is fixed through a connecting plate 159 fixed to a front end of a piston rod 157 of an air cylinder 156 and a mounting plate 161 fixed to an end portion of the connecting plate 159 by means of a bolt 163. A front end of a guide rod 165 is fixed to the connecting plate 159, and a brake unit 167 braking to position at a predetermined position in the lateral direction of the guide rod 165 in the drawing is provided.

The air cylinder 156 and the brake unit 167 are connected and fixed by a common supporting bracket 169, and a lower end of the supporting bracket 169 is mounted on the moving body 47.

The guide rod 165, the connecting plate 159 and the mounting plate 161 integrally moves in the same direction with the rear side pressing portion 147 in accordance that the air cylinder 156 operates to move the piston rod 157 in the rightward direction in FIG. 32, thereby pressing the flange 151 by means of the saw tooth 147a. In accordance with this pressing operation, a saw tooth 145a of the front side pressing portion 145 relatively presses the front side flange 149, so that both of the pressing portions 145 and 147 constitute a pair of pressing means for pressing the inner peripheral edge of the front door opening portion 9a to a direction of being mutually apart from each other. A positioning of the work in the transfer direction and the lateral direction perpendicular to the transfer direction can be performed by pressing the flanges 149 and 151 by means of the saw teeth 145a and 147a, respectively.

Figure 33:
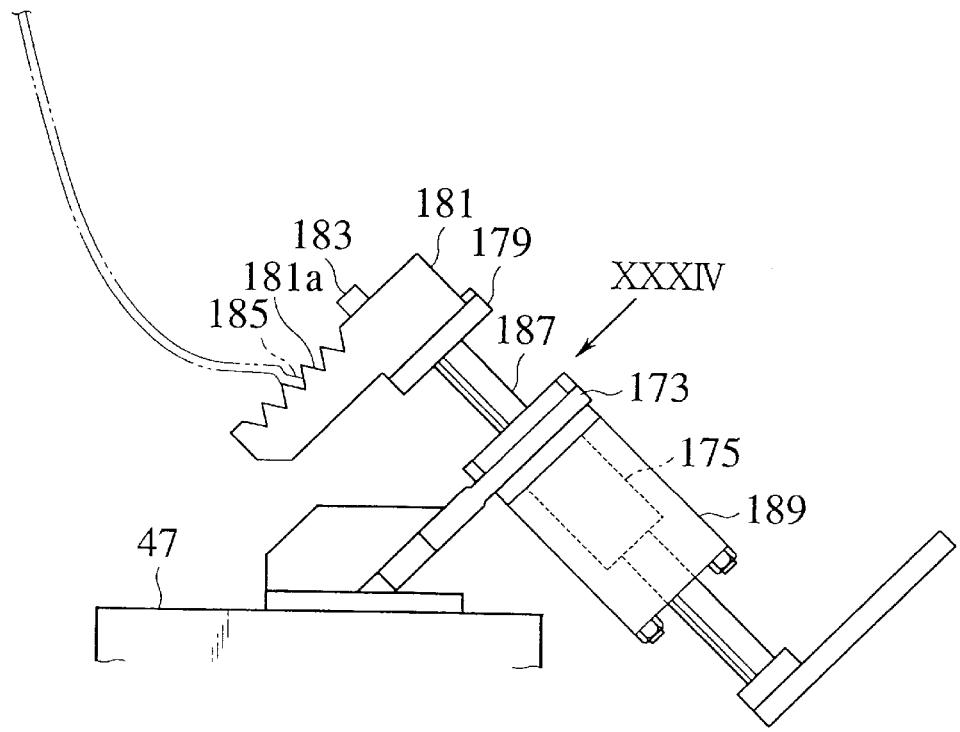
FIG. 33 is an enlarged view as seen from an arrow XXXIII of FIG. 27.
Figure 34:
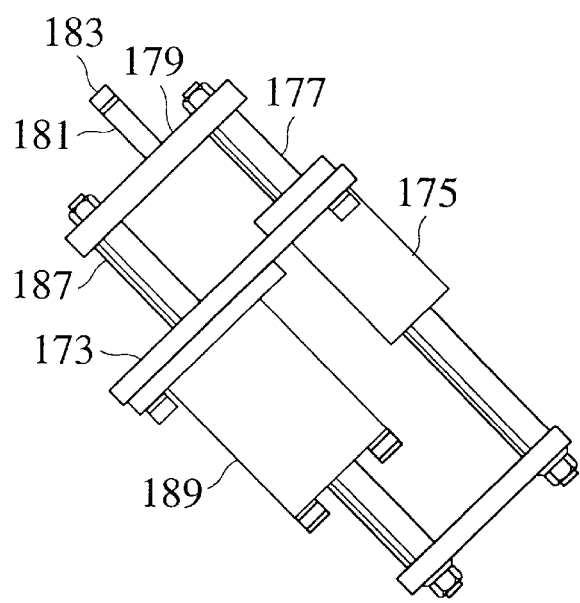
FIG. 34 is a view as seen from an arrow XXXIV of FIG. 33.

FIG. 33 is an enlarged view as seen from an arrow XXXIII of FIG. 27 which shows the positioning portion 135. A supporting bracket 173 projecting toward a rightward and obliquely upper direction is mounted on the moving body 47. An air cylinder 175 is attached to a front end of the supporting bracket 173, as shown in FIG. 34 corresponding to a view as seen from an arrow XXXIV of FIG. 33. A mounting plate 179 is fixed to a front end of a piston rod 177 of the air cylinder 175, and a flange receiver 181 with a saw tooth 181a extended in a direction perpendicular to the transfer direction is mounted to the mounting plate 179 by means of a bolt 183. A flange lower end 185 of the rear fender part 11 enters to the saw tooth 181a of the flange receiver 181.

A front end of a guide rod 187 is fixed to the mounting plate 179. The supporting bracket 173 is provided with a brake unit 189 braking so as to position the guide rod 187 at a predetermined position in the extending direction of the guide rod 187.

The guide rod 187 and the mounting plate 179 integrally moves in the same direction with the flange receiver 181 in accordance that the air cylinder 175 operates to move the piston rod 177 in the leftward obliquely upper direction in FIG. 34, thereby pressing the flange lower end 185 by means of the saw tooth 181a. In accordance with this pressing operation, vibration of the rear fender part 11 is prevented.

Also in the assembling apparatus for assembling a body side shown in FIG. 27, since the welding operation of the body side outer 7 is performed in an upright position and in a state of standing, a deformation is hard to be generated in comparison with a state of being horizontally laid, so that an assembling accuracy is improved. Further, since the side sill receivers 141 and 143 for positioning in the vertical direction and the pressing portions 145 and 147 for positioning in the transfer direction and the lateral direction perpendicular to the transfer direction are structured such that the flange end portion of the work enters to the V-shaped recess portions 141a and 143a and the saw teeth 145a and 147a, it can easily correspond to the different type of vehicles and can be widely used.

Figure 35:
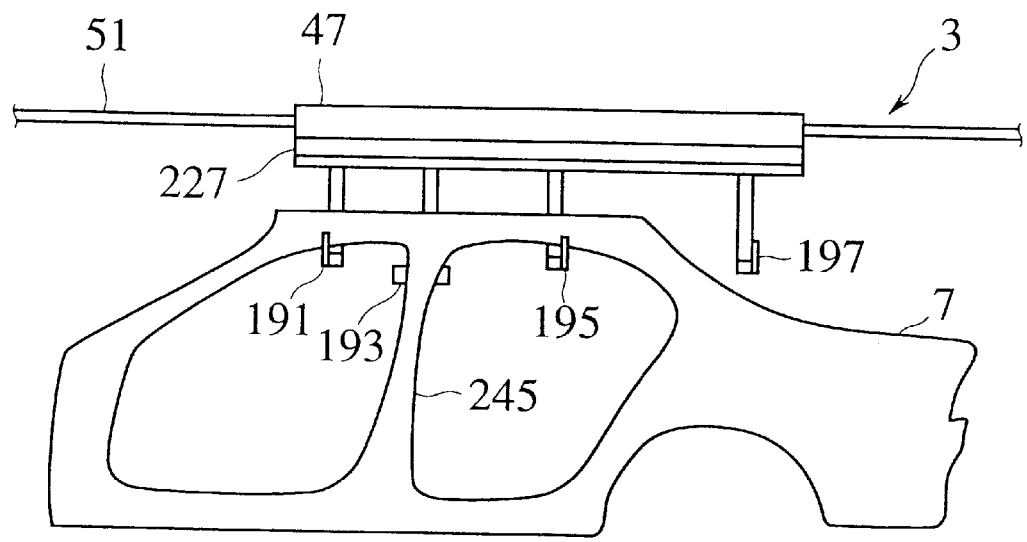
FIG. 35 is a side elevational view showing a state in which a work as a body side outer for a sedan vehicle is set on a transfer apparatus in an assembling apparatus for assembling a body side for an automotive vehicle in accordance with further embodiment of the present invention.
Figure 36:
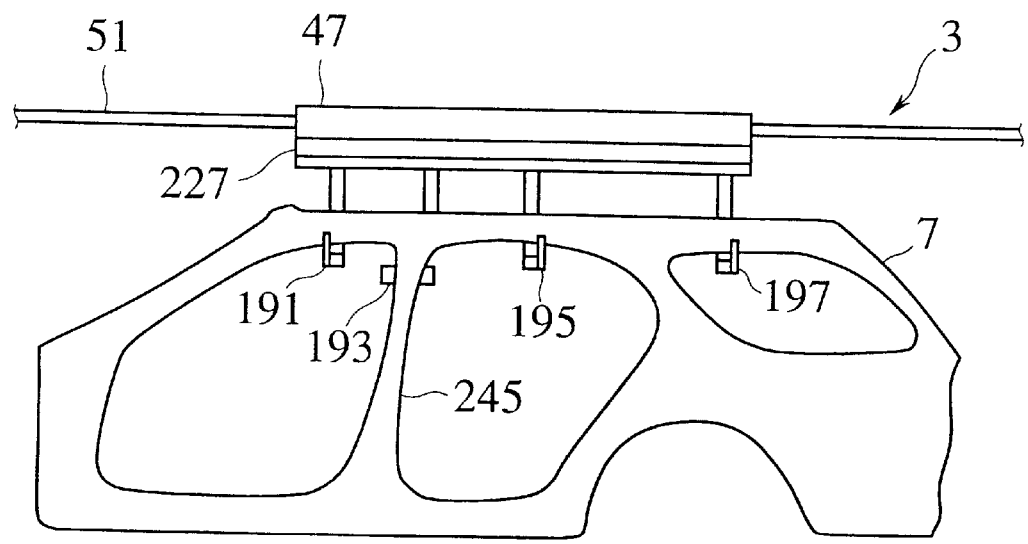
FIG. 36 is a side elevational view showing a state in which a body side outer for a wagon vehicle is set on a transfer apparatus in an assembling apparatus for assembling a body side for an automotive vehicle shown in FIG. 35.

Referring now to FIGS. 35 to 45, a further embodiment according to the present invention will be explained hereinafter. FIGS. 35 and 36 relates to an assembling apparatus for assembling a body side for an automotive vehicle of the embodiment. The transfer apparatus 3 in this embodiment which is located above the body side outer 7 with four positioning devices 191, 193, 195 and 197 as positioning and fixing means for positioning and fixing the body side outer 7 by suspending and supporting the body side outer 7 are provided in the moving body 47 moving along the guide rail 51 in such a manner that the positioning devices 191, 193, 195 and 197 project downwardly. FIGS. 35 and 36 show states of suspending and supporting the body side outer 7 for a sedan-typed vehicle, and another body side outer 7 for a wagon-typed vehicle, respectively.

Figure 37:
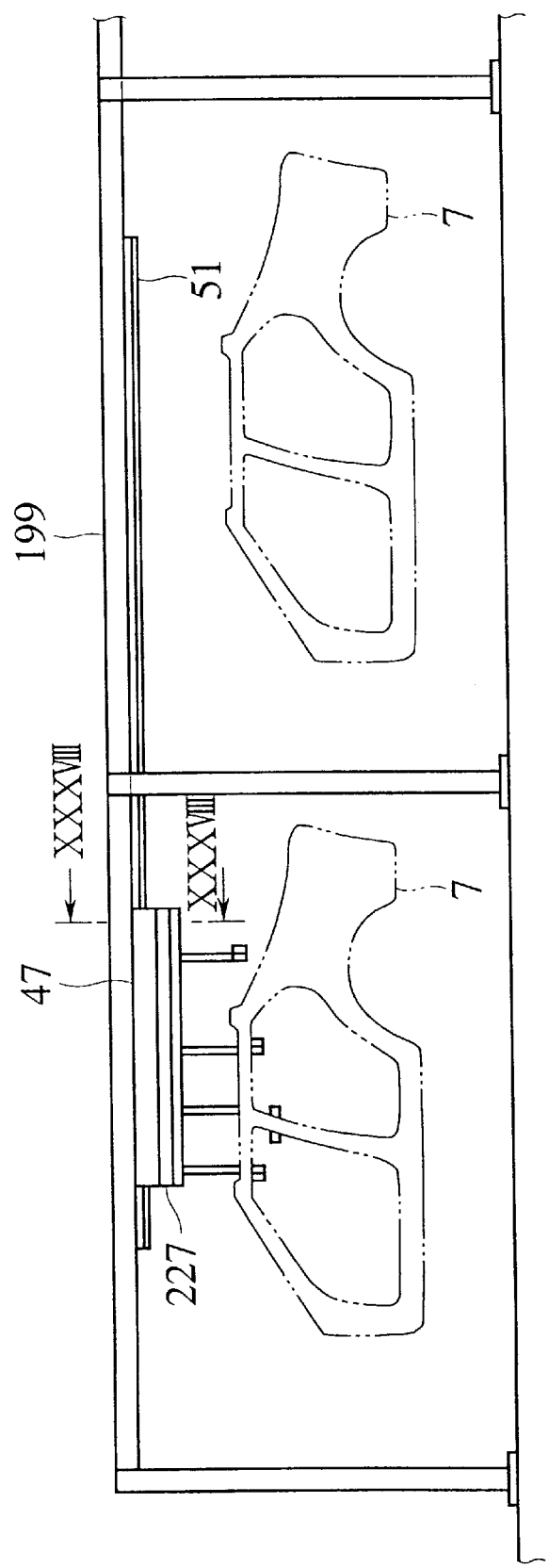
FIG. 37 is a totally schematic view of the transfer apparatus shown in FIGS. 35 and 36.

FIG. 37 is a totally schematic view of the transfer apparatus 3 mentioned above, and the guide rail 51 is provided along a monorail beam 199. The work is successively transferred in accordance that the moving body 47 moves on the guide rail 51.

Figure 38:
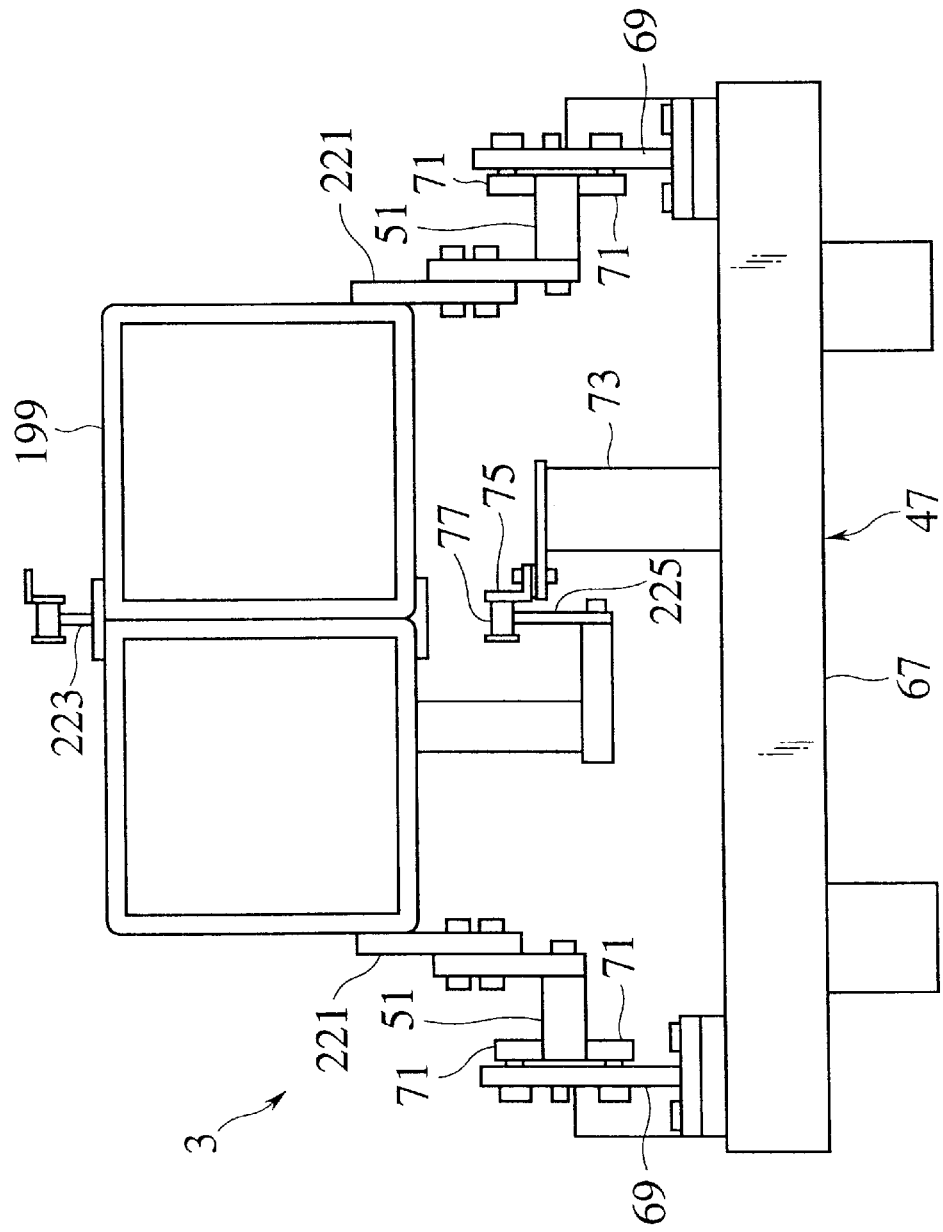
FIG. 38 is an enlarged cross sectional view along a line XXXVIII—XXXVIII in FIG. 37.

FIG. 38 is an enlarged cross sectional view along a line XXXVIII—XXXVIII of FIG. 37., and the guide rail 51 is fixed to both right and left side portions of the monorail beam 199 through a bracket 221. The moving body 47 is structured such that, in the same manner as that of the embodiment mentioned above, the side plate 69 is provided in both right and left side portions of the horizontal plate 67 and the cam follower 71 is rotatably provided in the side plate 69 in such a manner as to hold the guide rail 51 from the upper and lower portions.

Further, the chain 77 is attached to the chain mounting portion 73 provided on the upper surface of the moving body 47 mentioned above through the attachment 75. The chain receivers 223 and 225 are respectively provided in the upper portion and the lower portion of the monorail beam 199 as shown in FIG. 38.

Figure 39:
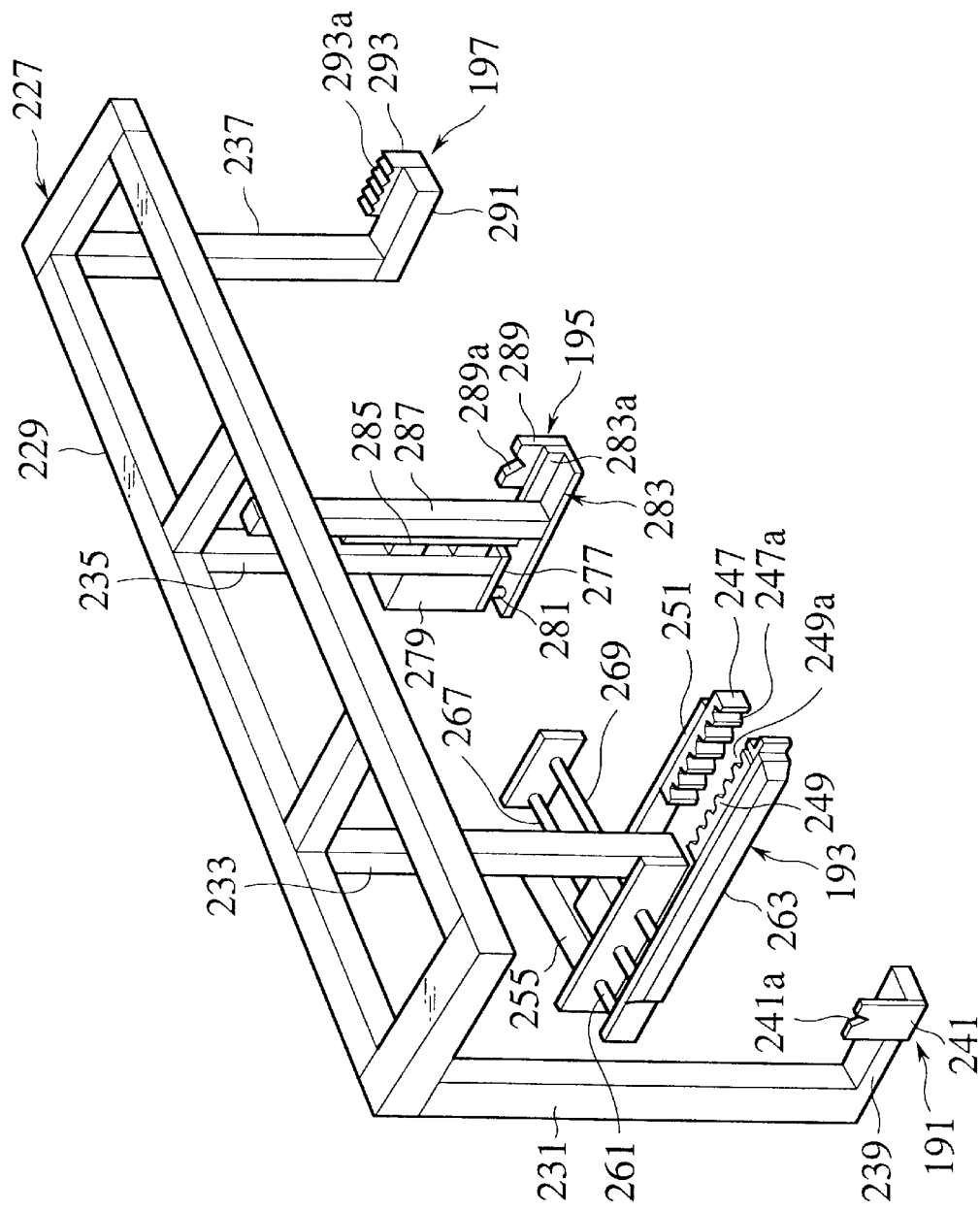
FIG. 39 is a perspective view of a positioning unit used for the transfer apparatus shown in FIGS. 35 and 36.

FIG. 39, as a perspective view, shows a positioning unit 227 structured such that four positioning devices 191, 193, 195 and 197 attached to the moving body 47 shown in FIGS. 35 and 36 are united. The positioning unit 227 is provided with abase frame 229 fixed to the lower surface of the moving body 47, supporting rods 231, 233, 235 and 237 are provided along one of the side portions of the base frame 229 at a predetermined interval in such a manner as to downward project, and the positioning devices 191, 193, 195 and 197 are respectively provided in the lower portions of the supporting rods 231, 233, 235 and 237.

Figure 40:
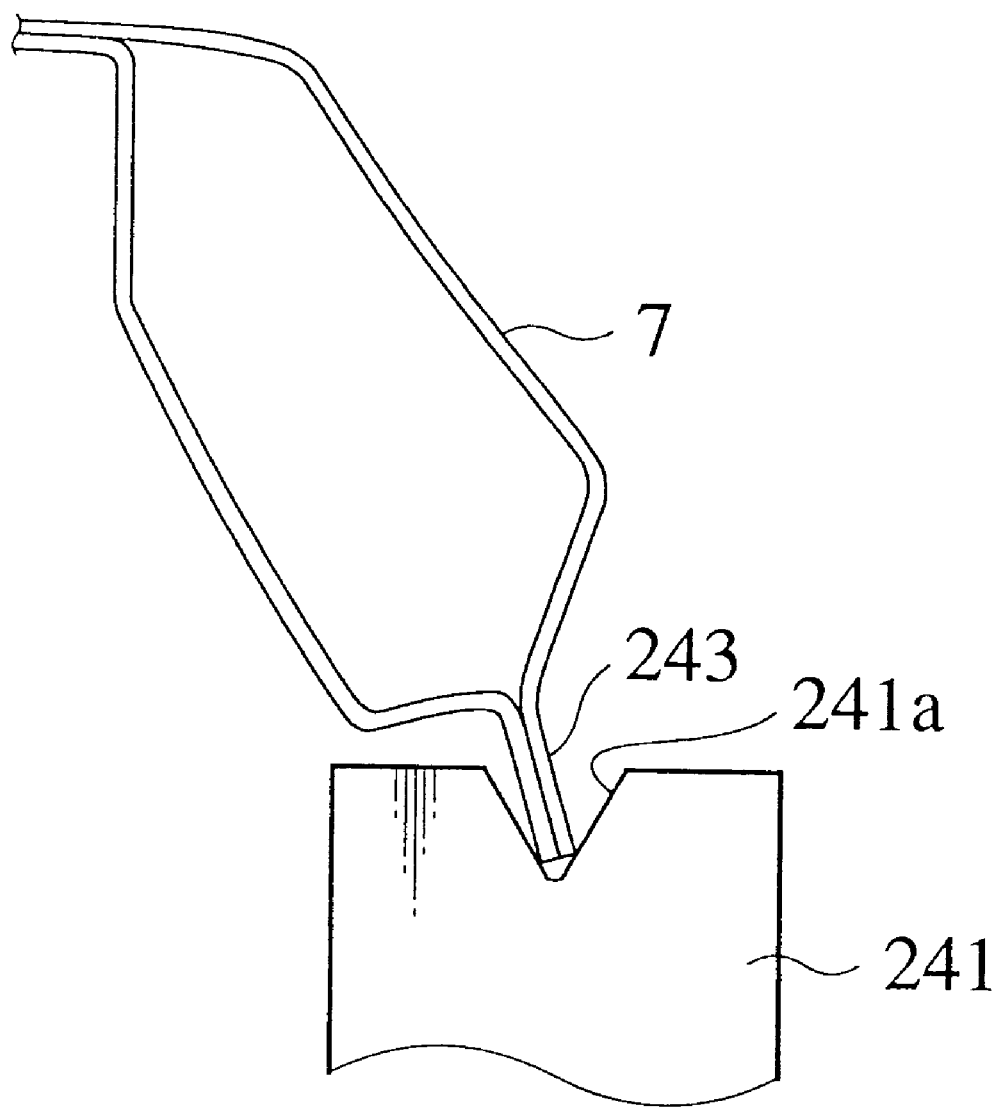
FIG. 40 is an operationally schematic view which shows a state of supporting a roof rail portion of a front part in the positioning unit shown in FIG. 39.

A horizontal rod 239 is mounted to the lower end of the supporting rod 231 in which the positioning device 191 is provided. A roof rail receiver 241 with a V-shaped concave portion 241a is attached to the side surface of front end of the horizontal rod 239 close to the forward end in the transfer direction. To the roof rail receiver 241, as shown in FIG. 40, the flange lower end 243 in the body side outer 7 at the portion corresponding to the front part 9 enters so that the positioning in the vertical direction of the work and in the lateral direction perpendicular to the transfer direction can be performed.

Figure 41:
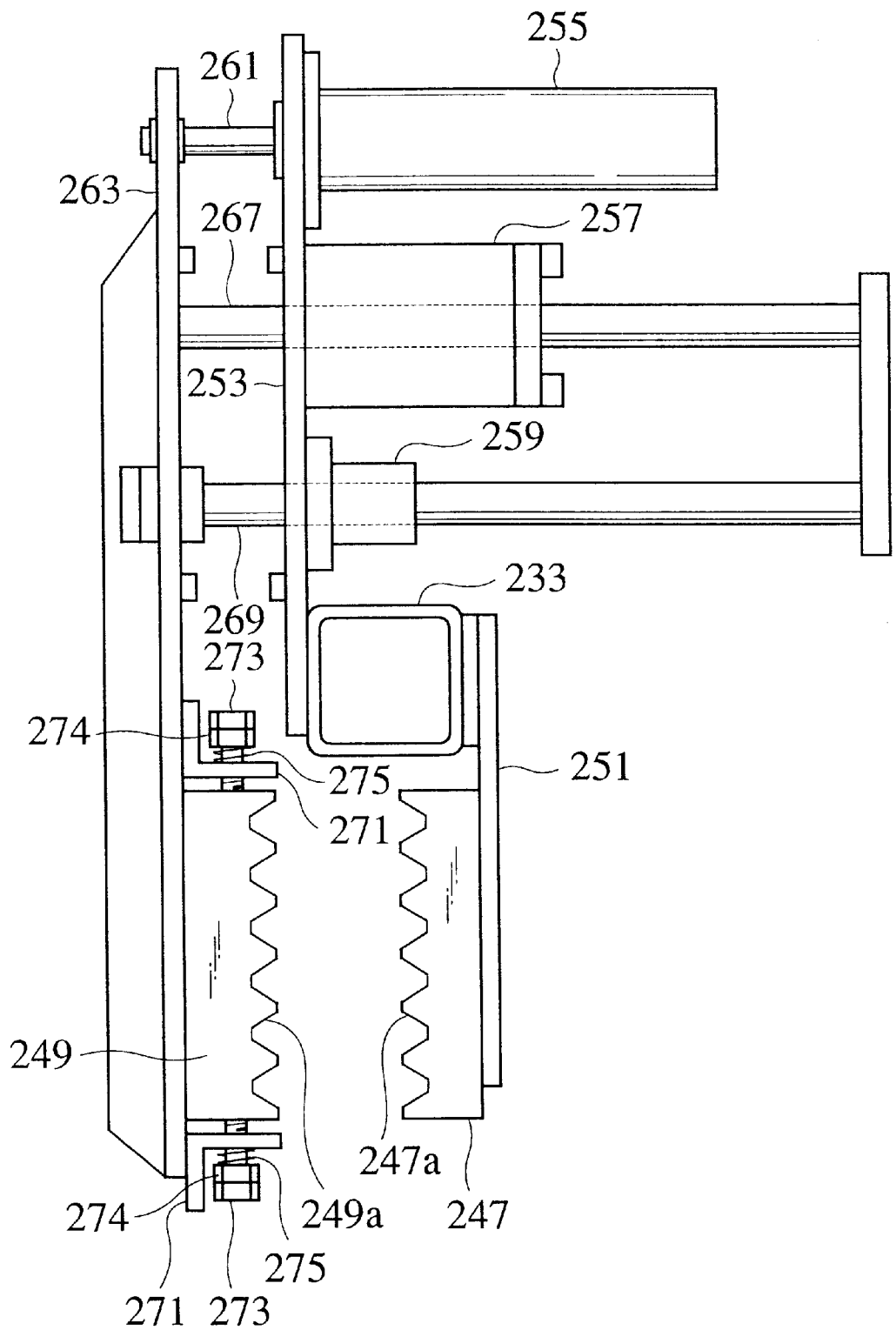
FIG. 41 is a plan view which shows details of a positioning device for supporting a center pillar of a front part in the positioning unit shown in FIG. 39.

The positioning device 193 is provided with a pair of pressing portions 247 and 249 as a pair of work receivers serving as a holding portion for holding a portion near the upper end portion of the center pillar 245 shown in FIGS. 35 and 36 in the body side outer 7 from both front and rear sides in the transfer direction, as shown in FIG. 41 which is an partially enlarged plan view of FIG. 39. The saw teeth 247a and 249a serving as a pressing portion extended in the lateral direction perpendicular to the transfer direction are formed in the portions mutually opposing to each other of the work receivers 247 and 249.

One of the pressing portions 247 close to the rear side in the transfer direction is fixed to the side surface close to the rear side in the transfer direction of the supporting rod 233 through the supporting bracket 251. A side surface close to one end side of the supporting bracket 253 is fixed to the side surface close to the front side in the transfer direction of the supporting rod 233, and an air cylinder 255, a brake unit 257 and a linear bush bearing 259 are successively mounted to the supporting bracket 253 from the other end side, respectively. An end portion close to one side of a mounting plate 263 is fixed to a front end of a piston rod 261 in the air cylinder 255, and the pressing portion 249 is mounted to an end portion close to the other side of the mounting plate 263 in such a manner as to move toward a longitudinal direction (a vertical direction in FIG. 41) according to the structure specifically described hereinafter.

Figure 42:
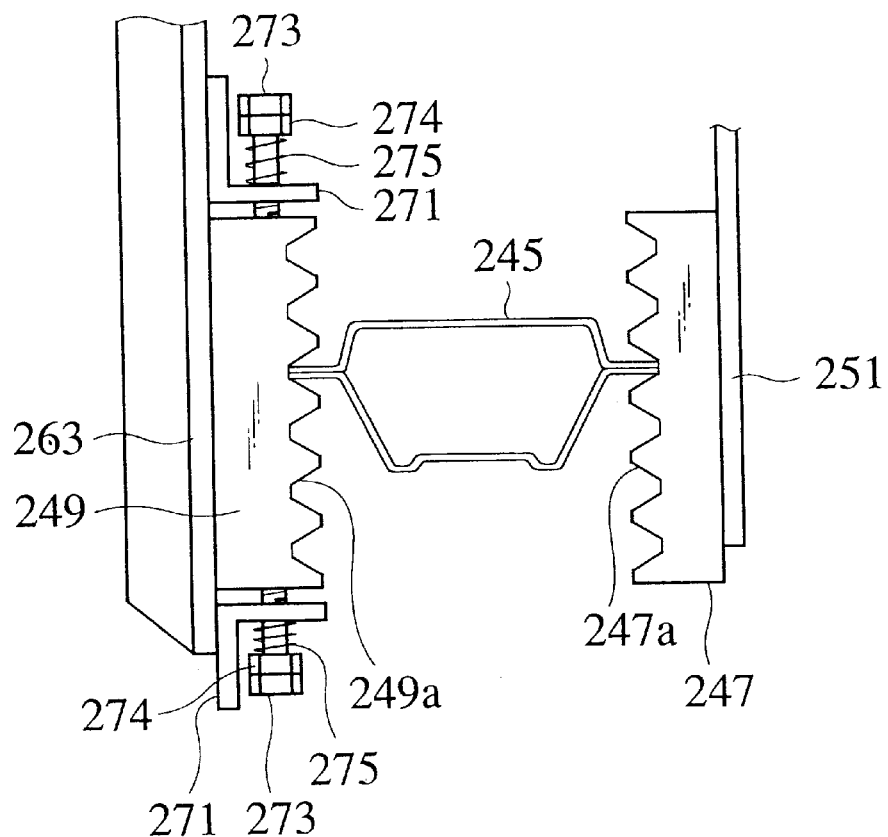
FIG. 42 is an operationally schematic view which shows a state of supporting a center pillar by the positioning device shown in FIG. 41.

A front end of a guide rod 267 sliding with respect to the brake unit 257 so as to perform a braking operation and a front end of a guide rod 269 sliding with respect to the guide shoe 259 are respectively fixed to the mounting plate 263 mentioned above. The air cylinder 255 operates to draw the piston rod 261, whereby the mounting plate 263 and the pressing portion 249 move and displace in a rightward direction in FIG. 41, that is, the direction opposite to the transfer direction with being integrally guided by the guide rods 267 and 269, thereby holding and fixing the center pillar 245 from both ends by two pressing portions 247 and 249 as shown in FIG. 42. In this state, the fixing state is kept by the operation of the brake unit 257, and a positioning in the transfer direction is performed.

An L-shaped mounting device 271 disposed in the pressing portion 249 at a predetermined interval is fixed to the mounting plate 63 near both ends in the longitudinal direction of the pressing portion 249. A bolt 273 is movably inserted to the mounting device 271 and a front end thereof is screwed and fixed to the pressing portion 249. A spring 275 is interposed between the mounting device 271 and an adjusting nut 274 meshed with the bolt 273, whereby the pressing portion 249 can be elastically held in the mounting device 271 together with two bolts 273.

As shown in FIG. 39, an air cylinder 279 is attached on a supporting plate 277 in a state of being adjacent to the supporting rod 235 fixed to the lower end of the supporting rod 235 to which the positioning portion 195 is mounted, and a front end of a piston rod 281 of the air cylinder 279 is fixed to a mounting plate 283 extended in the lateral direction perpendicular to the transfer direction. A lower end of a movable rod 287 capable of vertically moving through a linear guide 285 with respect to the side surface of the supporting rod 235 is fixed on an upper surface of a substantially central portion in the longitudinal direction of the mounting plate 283. Further, a roof rail receiver 289 with a V-shaped concave portion 289a is attached to an upward bending portion 283a formed at the rear side in the transfer direction of the front end side of the mounting plate 283. The roof rail receiver 289 is structured such that, in the same manner as the roof rail receiver 241 in the positioning portion 191 mentioned above, the flange lower end 243 of the roof rail in the body side outer 7 at the portion corresponding to the rear fender part 11 enters as shown in FIG. 40, and the positioning in the vertical direction and the lateral direction perpendicular to the transfer direction can be performed.

Figure 43:
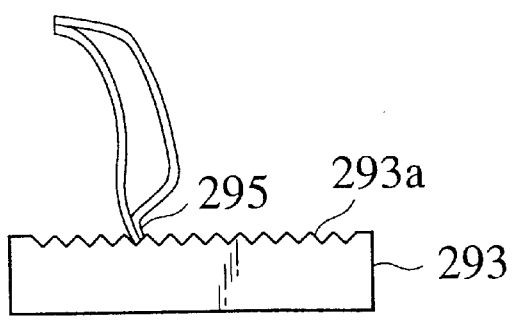
FIG. 43 is an operationally schematic view which shows a state of supporting a roof rail portion for a wagon vehicle in the positioning unit shown in FIG. 39.

A horizontal rod 291 is fixed to the lower end of the supporting rod 237 to which the positioning portion 197 is mounted, and a flange receiver 293 for supporting the roof rail portion in the rear portion of the body side outer 7 in the wagon vehicle shown in FIG. 36 is attached to the side surface close to the rear side in the transfer direction of the horizontal rod 291. The flange receiver 293 is structured such that a saw tooth 293a is formed in the receiving portion and a flange lower end 295 of the roof rail enters into the saw tooth 293a, as shown in FIG. 43, whereby the positioning in the vertical direction and the lateral direction perpendicular to the transfer direction can be performed.

As described hereinbefore, in the embodiment of the assembling apparatus assembling a body side shown in FIGS. 35 to 43, the body side outer 7 is positioned and transferred in an upright position. Furthermore, the welding operation is also performed and applied to the body side outer 7 in the upright position by the welding robots and work set robot in the first embodiment. Therefore, deformation is hard to be generated in comparison with a state of being horizontally laid, and the assembling accuracy can be improved.

The body side outer 7 during the assembling operation mentioned above is positioned in the vertical direction and the lateral direction perpendicular to the transfer direction by means of the positioning portions 191, 195 and 197, and is positioned in the transfer direction by the positioning portion 193. Further, since the positioning portions are respectively structured such that the flange end portion of the work enters into the V-shaped concave portions 241a and 289a and the saw teeth 293a, 247a and 249a, the apparatus can easily correspond to the different types of vehicles and can be widely used. Particularly, since the saw teeth 247a, 249a and 293a are extended in the lateral direction perpendicular to the transfer direction, even in the case of the vehicle type in which the center pillar 245 and the lower end 295 of the roof rail are shifted in this direction, the apparatus can easily correspond thereto.

Since the roof rail receiver 289 with the V-shaped concave portion 289a in the positioning portion 195 can vertically move by the air cylinder 279, the apparatus can correspond thereto even when the receiving position in the vertical direction of the work by the roof rail receivers 241 and 293 at the front and rear sides are different from each other in accordance with the vehicle type.

The positioning portion 193 sets the pressing portion 249 at the front side to be apart from the pressing portion 247 in the rear side at a time of setting the body side outer 7 to the positioning unit 227, and in this state, positions the center pillar 245 near the pressing portion 247 at the rear side so as to move the pressing portion 249 in the front side to the rear side in accordance with the operation of the air cylinder 255, thereby holding the center pillar 245 therebetween. At this time, as shown in FIG. 42, the pressing portion 249 at the front side is movably supported in the lateral direction perpendicular to the transfer direction by the springs 275 at both ends, so that the saw tooth 249a of the end portion in the center pillar 245 can easily enter into the groove in response to the movement in the lateral direction mentioned above, and the positioning and clamping can be certainly performed.

Figure 44:
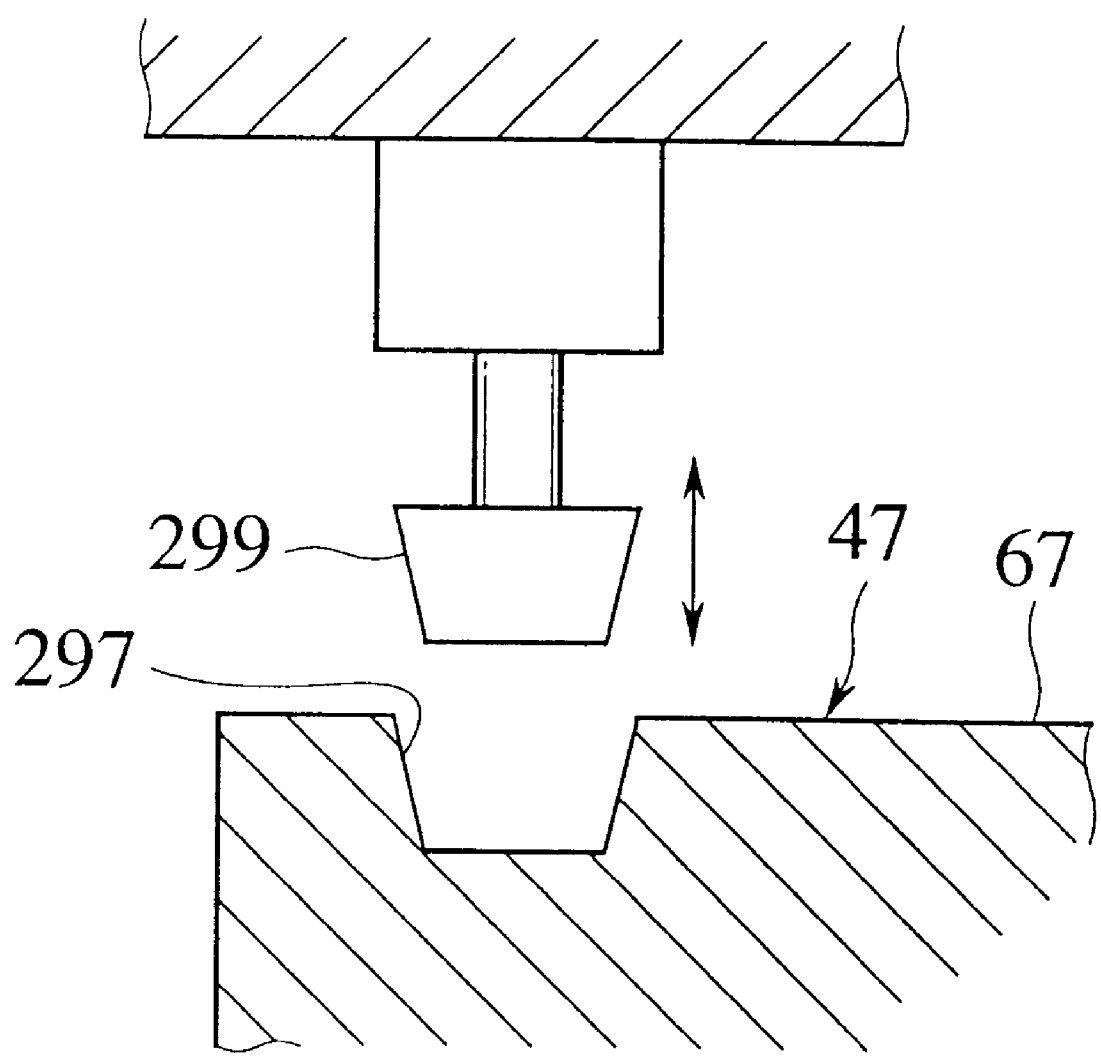
FIG. 44 is a plan cross sectional view of a positioning mechanism for positioning a transfer direction of a moving body in the transfer apparatus shown in FIGS. 35 and 36.

With respect to a positioning of the moving body 47 shown in FIGS. 35 and 36 in each of the working stages I, II, III, IV and V along the transfer direction in FIG. 3, a concave portion 297 is provided on the side surface of the horizontal plate 67 in the moving body 47, and a taper-like pin 299 having a tapered front end and inserted to the concave portion 297 is provided from a side portion of the transfer apparatus 3 in such a manner as to move forward and backward, thereby treating the positioning, as shown in FIG. 44 corresponding to a schematically plan cross sectional view as seen from an upper portion of the transfer apparatus 3.

Figure 45:
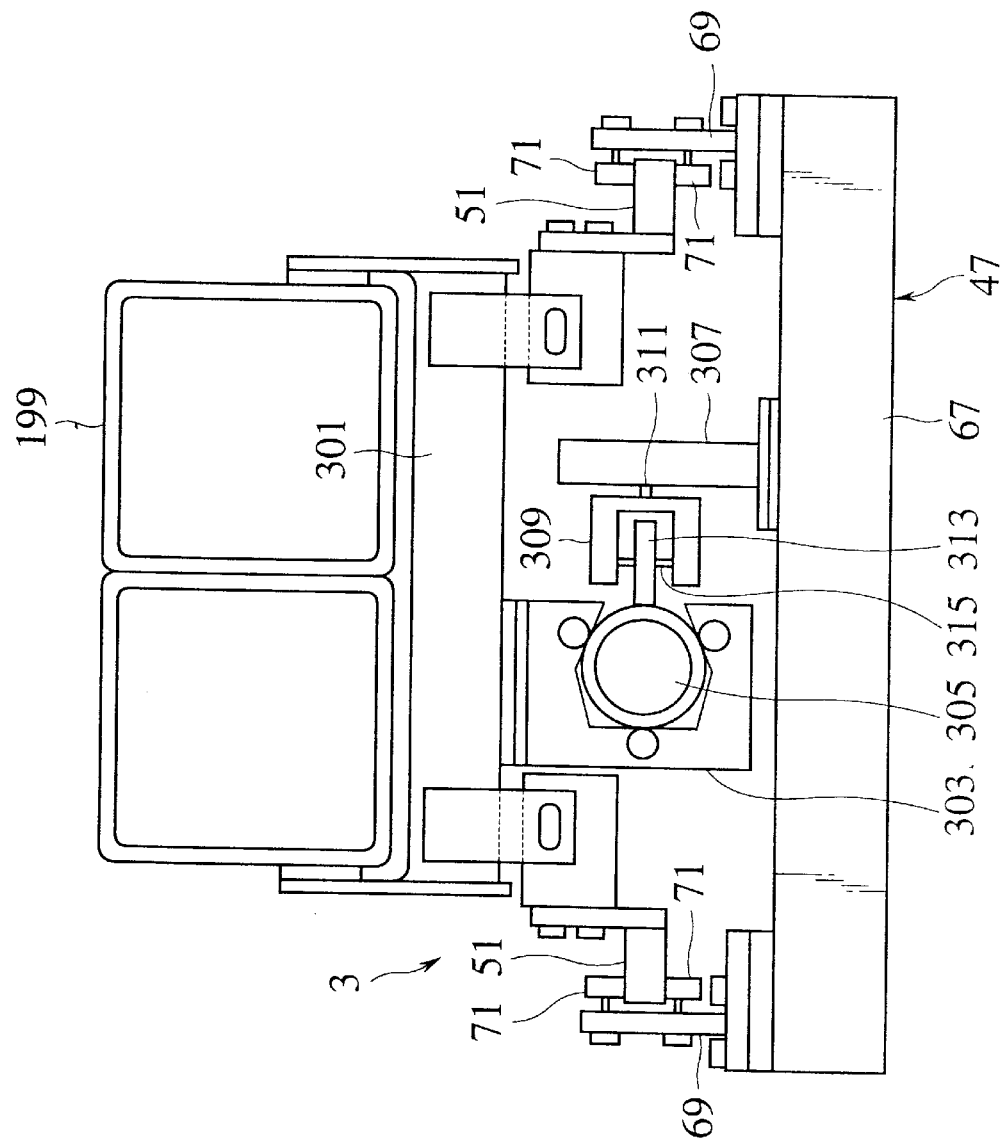
FIG. 45 is a cross sectional view corresponding to FIG. 38 which shows another embodiment of the transfer apparatus.

FIG. 45 shows another embodiment of another type of transfer apparatus which is modified from the transfer apparatus 3 utilizing the chain shown in FIG. 38. The transfer apparatus 3 is structured such that a drive shaft 305 is provided in a fixing end bracket 301 attached to the lower portion of the monorail beam 199 through a supporting member 303. The drive shaft 305 is extended and disposed along the transfer direction (the direction perpendicular to the surface of the paper where the FIG. 45 is drawn), and is rotatable with respect to the supporting member 303.

On the contrary, a guide wheel holding device 309 is rotatably provided in a moving side bracket 307 provided on the horizontal plate 67 close to the moving body 47 through an axis 311, and a guide wheel 313 being in contact with the drive shaft 305 in a state of being pressed by, for example, a spring or the like is rotatably held in the guide wheel holding device 309 through an axis 315. The guide wheel 313 is made of a material having a great coefficient of friction, for example, a urethane rubber or the like, obliquely rolls and spirally moves on the drive shaft 305 by rotating the drive shaft 305 in a state of displacing the guide wheel holding device 309 at an appropriate angle from a state shown in FIG. 45, so that the moving body 47 with the guide wheel 313 moves along the drive shaft 305 in the transfer direction in accordance therewith, thereby transferring the work.

In addition above, the transfer apparatus 3 shown in FIG. 27 the construction of driving shown in FIG. 45 may be employed. Furthermore, for example, a method utilizing the linear motor may be applicable to the transfer apparatus 3 shown in FIG. 27.

Furthermore, in those embodiments, the welding robots 5, 17, 21 and 29 can be replaced with a riveting robot, a caulking robot or with a bonding robot, as another assembling robot other than the welding robots 5, 17, 21 and 29. In this case, the riveting robot, the caulking robot with a caulking iron like member or the bonding robot with adhesive assembles alternatively or selectively the aforementioned parts 9, 11, 13, 15, etc. by connecting to each other, respectively.

As specifically described above along the embodiments, according to a first aspect of the present invention, there is provided an assembling apparatus assembling a body side of an automotive vehicle, comprising; a moving body provided in a transfer line; a clamp device mounted to the moving body fixing and positioning a body side outer in an upright position in which the body side outer is fixed in such a manner that a roof rail end of the body side outer is positioned substantially above the side sill end of the body side outer; and an assembling robot disposed in a side of the transfer line, the assembling robot assembling the body side by connecting the body side outer positioned by the clamp device.

In accordance with the assembling apparatus assembling a body side mentioned above, in the upright position of the body side outer by the clamp device, the lower end of the side sill thereof is fixed and positioned, and the assembling operation is performed with respect to the body side outer in the upright position by the assembling robot disposed in the side portion of the transfer line.

Accordingly, the side sill lower end which can be made the same shape between the different vehicle kinds is positioned and fixed and the assembling operation of the body side is performed by the assembling robot in the upright position, so that an exclusive or specific jig for fixing the body side outer is not required, the fixing device for positioning and fixing the work can be made compact and widely used, and a cost for equipment can be widely reduced. Further, since the operation of the assembling robot is performed from both sides of the body side outer in the standing state, an interference between the robots is avoided, and an efficiency of operation can be improved. Further, since the transfer and assembling operation is performed in a state of standing the body side outer, the deformation is hardly generated in comparison with the state of being horizontally laid, so that in addition that the assembling accuracy is improved, the necessary operating space becomes a little.

According to a second aspect of the present invention, as it depends from the first aspect, wherein the clamp device comprises: a clamp member for holding and fixing a lower end of a side sill of each of a front part and a rear fender part constituting the body side outer from a lateral direction perpendicular to the transfer direction in a state where the body side outer is positioned in a vertical direction; and a positioning projection provided on the moving body to be inserted into a notch formed in the side sill at lower end so that the body side outer is positioned in the transfer direction.

In accordance with the assembling apparatus assembling a body side mentioned above, by holding and fixing the side sill lower end of each of the front part and the rear fender part by the clamp member, the positioning in the lateral direction perpendicular to the vertical direction and the transfer direction can be performed, and the positioning in the transfer direction can be performed by inserting the positioning projection to the notch of the side sill lower end.

Therefore, the positioning of the body side outer can be certainly performed in the lateral direction and the vertical direction with respect to the transfer direction, and in the transfer direction with a simple structure.

According to a third aspect of the present invention, as it depends from the first aspect, wherein the clamp device comprises: a side sill receiver provided with a V-shaped recess portion to which a side sill lower end of each of the front part and the rear fender part constituting the body side outer is inserted; and a pair of pressing means for pressing a forward end and a rearward end of the transfer direction in an inner peripheral edge of a door opening portion in the front part in a direction of mutually moving apart from each other.

In accordance with the assembling apparatus mentioned above, the positioning in the vertical direction can be performed by inserting the side sill lower end to the V-shaped recess portion, and the positioning in the transfer direction and the lateral direction perpendicular to the transfer direction can be performed by pressing the forward end and the rearward end in the transfer direction in the direction of moving mutually apart from each other within the door opening portion in the front part.

Accordingly, the positioning of the body side outer can be certainly performed with such a simple structure in the lateral direction and the vertical direction with respect to the transfer direction, and in the transfer direction.

According to a fourth aspect of the present invention, as it depends from the third aspect, wherein one of the pressing means is fixed; and the other of the pressing means is movable toward the longitudinal direction of the vehicle body.

In accordance with the assembling apparatus mentioned above, both pressing means can respectively press the inner peripheral edge to the front end and the rear end so as to position and fix thereto by moving the other in the direction of moving apart from the one in a state of setting the body side outer such that the inner peripheral edge of the door opening portion is positioned near the pressing direction of one of a pair of pressing means.

Therefore, the positioning and fixing can be certainly performed by moving the other in the direction of approaching the one in a state of setting the body side outer such that the inner peripheral edge of the door opening portion is positioned near the pressing direction of the one among a pair of pressing means.

According to a fifth aspect of the present invention, as it depends from the third aspect, wherein the pressing means are extended toward a lateral direction perpendicular to the transfer direction; and the pressing means are provided with a saw tooth-shaped pressing portion for pressing the inner peripheral edge of the door opening portion.

In accordance with the assembling apparatus mentioned above, the inner peripheral edge of the door opening portion can be positioned with respect to various kinds of vehicle body disposed at a different position in the lateral direction by the saw tooth-shaped pressing portion extended in the lateral direction perpendicular to the transfer direction.

According to a sixth aspect of the present invention, as it depends from the third fifth aspect, wherein the clamp device comprises: a saw tooth-shaped flange receiver provided on the moving body, the flange receiver extended in the lateral direction perpendicular to the transfer direction to receive a flange lower end of the rear fender part at the rear of the vehicle body: with respect to the side sill portion received by the side sill receiver.

In accordance with the assembling apparatus mentioned above, a vibration of the body side outer generated at a time of transferring or the like can be restricted by supporting the flange lower end of the rear fender part by the saw tooth-shaped flange receiver. Further, since the flange receiver is formed in a saw tooth shape extended in the lateral direction perpendicular to the transfer direction, it can be applied to various kinds of vehicle bodies.

According to a seventh aspect of the present invention, there is provided an assembling apparatus assembling a body side of an automotive vehicle, comprising; a moving body provided in a transfer line; a clamp device mounted to the moving body fixing and positioning a body side outer in an upright position in which the body side outer is fixed in such a manner that a roof rail end of the body side outer is positioned substantially above the side sill end of the body side outer; and an assembling robot disposed in a side of the transfer line, the assembling robot assembling the body side by connecting the body side outer positioned by the clamp device, wherein the clamp device projects downwardly from the moving body; and the clamp device fixes and positions the body side outer in such a manner that the roof rail end of the body side outer is hanged by the clamp device.

In accordance with the structure mentioned above, in the upright position, the body side outer by means of the positioning and fixing means, the roof rail end thereof is hanged suspendedly and supported so as to be fixed and positioned, and the assembling operation is performed with respect to the body side outer in a standing state by the assembling robot disposed in the side portion of the transfer line.

Therefore, a specific jig for fixing and holding the body side outer corresponding to each of the vehicle kinds is not required, so that the same effect as that of the first aspect such that the fixing jig for positioning and fixing the body side outer can be easily made compact and widely used can be obtained.

According to an eighth aspect of the present invention, as it depends from the seventh aspect, wherein the clamp device comprises: a roof rail receiver provided with a V-shaped recess portion to which a flange lower end of the roof rail in each of the front part and the rear fender part constituting the body side outer is inserted; and a holding portion to hold both of front and rear ends of a center pillar of the body side outer in the transfer direction.

In accordance with the assembling apparatus mentioned above, a positioning in the lateral direction perpendicular to the transfer direction and the vertical direction can be performed by inserting the flange lower end of the roof rail to the roof rail receiver having the V-shaped recess portion, and a positioning in the transfer direction can be performed by holding and fixing the center pillar from the forward and rearward portion in the transfer direction by means of the holding portion.

According to a ninth aspect of the present invention, as it depends from the eighth aspect, wherein the roof rail receiver is structured to move in the vertical direction to receive any one of the front part and the rear fender part.

In accordance with the assembling apparatus mentioned above, the positioning in a normal attitude can be performed by the roof rail receiver receiving each of the front part and the rear fender part even in the case of the different kinds of body side outer by moving the movable roof rail receiver in the vertical direction.

According to a tenth aspect of the present invention, as it depends from the eighth aspect, wherein one of the holding portions is fixed and the other is moved in the longitudinal direction of the vehicle body.

In accordance with the assembling apparatus mentioned above, both of the holding portions hold the center pillar so as to position and fix by moving the other in the direction of approaching the one in a state that the body side outer is set such that one end portion in the transfer direction of the center pillar is positioned near the holding direction of one of the holding portions.

According to an eleventh aspect of the present invention, as it depends from the eighth aspect, wherein the holding portion is provided with saw tooth-shaped pressing portions extending in the lateral direction perpendicular to the transfer direction; and the pressing portions press the center pillar from the both sides.

In accordance with the assembling apparatus mentioned above, the center pillar can be positioned with respect to various kinds of vehicle bodies disposed at the different position in the lateral direction mentioned above by the saw tooth-shaped pressing portion extended in the lateral direction perpendicular to the transfer direction.

According to a twelfth aspect of the present invention, as it depends from the first or the seventh aspect, the assembling apparatus assembling a body side of an automotive vehicle, further comprising: a positioning jig disposed in one side of the transfer line advancing toward the front part and the rear fender part positioned on the transfer line, the positioning jig positioning each of the parts from the one side; and a work set robot disposed in the opposite side of the transfer line to the positioning jig, the work set robot setting inner parts to the front part and the rear fender part.

In accordance with the assembling apparatus mentioned above, in a state that the positioning jig advances with respect to the front part and the rear fender part positioned on the transfer line so as to position from the side portion, the work set robot sets the inner parts to the front part and the rear fender part.

In this connection, the setting of the inner part and the welding operation can be performed in a more accurate manner.

According to a thirteenth aspect of the present invention, as it depends from the first or the seventh aspect, wherein the moving body is provided with cam followers attached to both front and rear ends of both right and left side portions perpendicular to the transfer direction, the cam followers can move along the transfer direction with being supported, and the transfer line is provided with a pair of guide rails for restricting a displacement of the cam followers in a lateral direction and a vertical direction with respect to the transfer direction, the guide rails are located in both right and left sides perpendicular to the transfer direction.

In accordance with the assembling apparatus mentioned above, since the cam follower mounted to the moving body is supported with being restricted the displacement in the lateral direction and the vertical direction with respect to the transfer direction by the guide rail, the positioning accuracy of the body side is certainly maintained and the load of the body side is applied to the guide rail, so that even in the case of using a chain as the transfer apparatus, the load is not applied to the chain and a stable welding operation and transfer operation can be performed.

According to a fourteenth aspect of the present invention, as it depends from the thirteenth aspect, wherein the cam follower is disposed in each of the right and left portions of the front side in the moving body and each of the right and left portions of the rear side thereof in such a manner as to hold the upper and lower portions of the guide rails.

In accordance with the assembling apparatus mentioned above, the moving body is restricted the displacement in the lateral direction and the vertical direction with respect to the transfer direction by the cam follower located in such a manner as to hole the upper and lower portions of the guide rails, so that a stable welding operation and transfer operation can be performed.

According to a fifteenth aspect of the present invention, as it depends from the thirteenth aspect, wherein the guide rails are located in such a manner as to hold the upper and lower portions of the cam followers provided in each of the right and left portions of the front side in the moving body and each of the right and left portions of the rear side thereof.

In accordance with the assembling apparatus mentioned above, the moving body is restricted the displacement in the lateral direction and the vertical direction with respect to the transfer direction by the guide rails located in such a manner as to hold the upper and lower portions of the cam follower, so that a stable welding operation and transfer operation can be performed.

According to a sixteenth aspect of the present invention, as it depends from the first or the seventh aspect, wherein the assembling robot is a welding robot assembling the body side by welding the body side outer.

According to a seventeenth aspect of the present invention, as it depends from the first or the seventh aspect, wherein the assembling robot is a riveting robot assembling the body side by riveting the body side outer.

According to an eighteenth aspect of the present invention, as it depends from the first or the seventh aspect, wherein the assembling robot is a caulking robot assembling the body side by caulking the body side outer.

According to a nineteenth aspect of the present invention, as it depends from the first or the seventh aspect, wherein the assembling robot is a bonding robot assembling the body side by bonding the body side outer.

While preferred embodiments of the present invention have been described using specific terms, such description is for illustrative purposes, and it is to be understood that changes and variations may be made without departing from the spirit or scope of the following claims.

What is claimed is:

1. An assembling apparatus assembling a body side of an automotive vehicle comprising:
   a moving body provided in a transfer line;
   a clamp device mounted to the moving body fixing and positioning a body side outer in an upright position wherein the body side outer is fixed in such a manner that a roof rail end of the body side outer is positioned substantially above a side sill end of the body side outer, the body side outer being constructed from a front part and a rear fender part;

an assembling robot disposed in a side of the transfer line, the assembling robot assembling the body side by connecting the body side outer positioned by the clamp device, a positioning jig disposed in one side of the transfer line advancing toward the front part and the rear fender part positioned on the transfer line, the positioning jig positioning each of the parts from the one side; and a work set robot disposed in the opposite side of the transfer line to the positioning jig, the work set robot setting inner parts to the front part and the rear fender part, wherein the clamp device comprises a saw tooth-shaped flange receiver defining a plurality of concave receiving portions provided on the moving body; and wherein the flange receiver extends in a lateral direction perpendicular to a transfer direction of the transfer line to receive a flange lower end of the rear fender part closer to a rear end of the body side of the automotive vehicle than the side sill end of the body side outer.

2. An assembling apparatus assembling a body side of an automotive vehicle comprising:

a moving body provided in a transfer line;

a clamp device mounted to the moving body fixing and positioning a body side outer in an upright position wherein the body side outer is fixed in such a manner that a roof rail end of the body side outer is positioned substantially above a side sill end of the body side outer, the body side outer being constructed from a front part and a rear fender part; and an assembling robot disposed in a side of the transfer line, the assembling robot assembling the body side by connecting the body side outer positioned by the clamp device, wherein the moving body is provided with four cam follower sets attached to a left and a right front portion and a left and a right rear portion of the moving body;

wherein the transfer line is provided with a pair of left and right guide rails disposed in parallel to the transfer line for restricting a displacement of the cam follower sets in a lateral direction and a vertical direction of the moving body; and wherein each of the cam follower sets is disposed to prevent movement of the guide rails in both the upward and downward vertical directions.

3. An assembling apparatus assembling a body side of an automotive vehicle comprising:

a moving body provided in a transfer line;

a clamp device mounted to the moving body fixing and positioning a body side outer in an upright position wherein the body side outer is fixed in such a manner that a roof rail end of the body side outer is positioned substantially above a side sill end of the body side outer, the body side outer being constructed from a front part and a rear fender part;

an assembling robot disposed in a side of the transfer line, the assembling robot assembling the body side by connecting the body side outer positioned by the clamp device, a positioning jig disposed in one side of the transfer line advancing toward the front part and the rear fender part positioned on the transfer line, the positioning jig positioning each of the parts from the one side; and a work set robot disposed in the opposite side of the transfer line to the positioning jig, the work set robot setting inner parts to the front part and the rear fender part, wherein the clamp device comprises a saw tooth-shaped flange receiver defining a plurality of concave receiving portions provided on the moving body; and wherein the flange receiver is retractable in a lateral direction perpendicular to a transfer direction of the transfer line and receives a flange lower end of the rear fender part at a location rearwardly from the side sill end of the body side outer.

* * * * *